(12) United States Patent
Miyazaki et al.

(10) Patent No.: US 12,306,479 B2
(45) Date of Patent: May 20, 2025

(54) OPTICAL MODULATOR AND OPTICAL TRANSMISSION APPARATUS USING SAME

(71) Applicant: SUMITOMO OSAKA CEMENT CO., LTD., Tokyo (JP)

(72) Inventors: Norikazu Miyazaki, Tokyo (JP); Toru Sugamata, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 542 days.

(21) Appl. No.: 17/763,959

(22) PCT Filed: Sep. 15, 2020

(86) PCT No.: PCT/JP2020/034975
§ 371 (c)(1),
(2) Date: Mar. 25, 2022

(87) PCT Pub. No.: WO2021/060088
PCT Pub. Date: Apr. 1, 2021

(65) Prior Publication Data
US 2022/0334415 A1     Oct. 20, 2022

(30) Foreign Application Priority Data
Sep. 26, 2019   (JP) .................................. 2019-175517

(51) Int. Cl.
*G02F 1/01*     (2006.01)
*G02F 1/03*     (2006.01)

(52) U.S. Cl.
CPC .......... *G02F 1/0126* (2013.01); *G02F 1/0316* (2013.01)

(58) Field of Classification Search
CPC .... G02F 1/0136; G02F 1/0147; G02F 1/0131; G02F 1/0344; G02F 1/0316; G02F 1/0126
See application file for complete search history.

(56) References Cited

U.S. PATENT DOCUMENTS

| | | |
|---|---|---|
| 2009/0290828 A1 | 11/2009 | Shimizu et al. |
| 2018/0088361 A1 | 3/2018 | Sugamata et al. |
| 2018/0180908 A1 | 6/2018 | Katou et al. |

FOREIGN PATENT DOCUMENTS

| | | |
|---|---|---|
| JP | 2007-139987 | 6/2007 |
| JP | 2009-244325 | 10/2009 |

(Continued)

OTHER PUBLICATIONS

International Search Report dated Oct. 20, 2020, Application No. PCT/JP2020/034975, 5 pages.

*Primary Examiner* — Ricky L Mack
*Assistant Examiner* — Journey F Sumlar
(74) *Attorney, Agent, or Firm* — Rankin, Hill & Clark LLP

(57) ABSTRACT

An optical modulator includes: an optical modulation element including a plurality of signal electrodes and generating two modulated light beams, each of which is modulated by two sets of electrical signals; a plurality of signal input terminals, each of which inputs an electrical signal; a relay substrate on which a plurality of signal and ground conductor patterns are formed, the relay substrate propagating the two sets of electrical signals by two pairs of the adjacent signal conductor patterns; and a housing, in which at least one signal conductor pattern includes at least one component mounting portion including at least a parallel circuit of a resistor and a capacitor, and the relay substrate includes a metal body connected on the ground conductor pattern or a substrate removal portion that sandwiches a portion of the signal conductor pattern downstream of the component mounting portion along a propagation direction of the electrical signal.

9 Claims, 18 Drawing Sheets

(56) References Cited

FOREIGN PATENT DOCUMENTS

| | | |
|---|---|---|
| JP | 2018-054929 | 4/2018 |
| JP | 2018-106091 | 7/2018 |

DETAILS OF PART A

DETAILS OF PART B

CROSS-SECTIONAL VIEW TAKEN ALONG ARROW LINE V-V

DETAILS OF PART D

DETAILS OF PART J

CROSS-SECTIONAL VIEW TAKEN ALONG ARROW LINE XXI-XXI

OPTICAL MODULATOR AND OPTICAL TRANSMISSION APPARATUS USING SAME

TECHNICAL FIELD

The present invention relates to an optical modulator including a relay substrate that relays propagation of an electrical signal between a signal input terminal and a signal electrode of an optical modulation element, and an optical transmission apparatus using the optical modulator.

BACKGROUND ART

In high-speed/large-capacity optical fiber communication systems, optical modulators incorporating waveguide type optical modulation elements are used in many cases. Particularly, optical modulation elements using $LiNbO_3$ (hereinafter, also referred to as LN) having electro-optic effects for substrates can realize high-bandwidth optical modulation characteristics with small optical losses, so the optical modulation elements are widely used in high-speed/large-capacity optical fiber communication systems.

The optical modulation element using the LN substrate includes Mach-Zehnder type optical waveguides and signal electrodes for applying a high-frequency electrical signal as a modulation signal to the optical waveguides. Then, the signal electrodes provided in the optical modulation element are connected to lead pins and connectors that are signal input terminals provided on a housing of the optical modulator, via a relay substrate provided in the housing in which the optical modulation element is accommodated. Thus, since the lead pins and connectors that are signal input terminals are connected to a circuit substrate on which an electronic circuit for causing the optical modulator to perform a modulation operation is mounted, an electrical signal output from the electronic circuit is applied to the signal electrodes of the optical modulation element via the relay substrate.

Due to the increasing transmission capacity in recent years, the main stream of modulation methods in optical fiber communication systems is multi-level modulation and the transmission format adopting polarized wave multiplexing for multi-level modulation, such as Quadrature Phase Shift Keying (QPSK) and Dual Polarization-Quadrature Phase Shift Keying (DP-QPSK), which are used in fundamental optical transmission networks and is also being introduced into metro networks.

An optical modulator that performs QPSK modulation (QPSK optical modulator) and an optical modulator that performs DP-QPSK modulation (DP-QPSK optical modulator) include a plurality of Mach-Zehnder type optical waveguides having a so-called nested structure called a nested type, each of which includes at least one signal electrode. Therefore, the optical modulators include a plurality of signal electrodes, and the above-described DP-QPSK modulation operation is performed in cooperation with high-frequency electrical signals applied to the signal electrodes. Specifically, the DP-QPSK modulator is configured to generate two modulated light beams, each of which is modulated by a pair of high-frequency electrical signals, and these two modulated light beams are combined and output as one modulated light beam.

In such an optical modulator, an electrical circuit element such as an electric filter for improving high-frequency characteristics or the like may be mounted on a signal line formed on a relay substrate (Patent Literature Nos. 1 and 2).

FIG. 18 is a plan view illustrating an example of a configuration of an optical modulator including such a relay substrate on which an electrical circuit element is mounted in the related art. An optical modulator 2200 includes, for example, an optical modulation element 2202 which is a DP-QPSK modulator formed on an LN substrate, and a housing 2204 in which the optical modulation element 2202 is accommodated. Here, the housing 2204 includes a case 2214a and a cover 2214b. The optical modulator 2200 also includes an input optical fiber 2208 and an output optical fiber 2210 which are fixed to the case 2214a and perform an input and output of light to the optical modulation element 2202.

Four signal input terminals 2224a, 2224b, 2224c, and 2224d (hereinafter, collectively also referred to as a signal input terminal 2224) for inputting a high-frequency electrical signal for driving the optical modulation element 2202 from an external electronic circuit are further provided, in the case 2214a of the housing 2204. Specifically, the signal input terminal 2224 is, for example, a center electrode of electrical connectors 2216a, 2216b, 2216c, and 2216d (hereinafter, collectively also referred to as an electrical connector 2216) which are high-frequency coaxial connectors. The high-frequency electrical signals input from the respective signal input terminals 2224 are input to one ends of the four signal electrodes 2212a, 2212b, 2212c, and 2212d (hereinafter, collectively also referred to as a signal electrode 2212) provided in the optical modulation element 2202 via a relay substrate 2218 accommodated in the housing 2204, and terminated by a terminator 2220 with a predetermined impedance provided at the other end of the signal electrode 2212.

The optical modulation element 2202 outputs two modulated light beams from two output optical waveguides 2226a and 2226b, and the two output light beams are combined into one beam by a polarization-combining part 2228 including a polarization beam combining prism or the like. The combined light is output to the outside of the housing 2204 via the output optical fiber 2210.

FIG. 19 is a diagram illustrating the relay substrate 2218 and its periphery in the optical modulator 2200 illustrated in FIG. 18. Ground electrodes 2222a, 2222b, 2222c, 2222d, and 2222e are provided in the optical modulation element 2202 so that each of the signal electrodes 2212 constitutes a coplanar waveguide (CPW).

Further, on the relay substrate 2218, the signal conductor patterns 2230a, 2230b, 2230c, and 2230d (hereinafter, collectively also referred to as a signal conductor pattern 2230) respectively connecting the four signal input terminals 2224 and the four signal electrodes 2212 of the optical modulation element 2202 are formed. These signal conductor patterns 2230 form a high-frequency signal line together with ground conductor patterns 2240a, 2240b, 2240c, 2240d, and 2240e arranged on the relay substrate 2218 so as to sandwich the signal conductor pattern 2230 in a plane direction of the substrate.

Each of the four signal conductor patterns 2230 of the relay substrate 2218 is provided with component mounting portions 2250a, 2250b, 2250c, and 2250d (hereinafter, collectively also referred to as a component mounting portion 2250) on which an electric filter for improving high-frequency characteristics of the optical modulator 2200 is mounted, for example. FIG. 20 is a partial detailed view of a part J of the relay substrate 2218 illustrated in FIG. 19, and FIG. 21 is a cross-sectional view taken along arrow line XXI-XXI in FIG. 20. These drawings illustrate the configuration of the component mounting portion 2250b as an example of the component mounting portion 2250, and other component mounting portions 2250*a*, 2250*c*, and 2250*d* may have the same configuration.

The component mounting portion 2250*b* has, for example, the same configuration as the electric filter described in Patent Literature 1. That is, the component mounting portion 2250*b* includes a thin film resistor 2252*b* (a hatched portion illustrated in FIGS. 20 and 21) formed as an electrical circuit element in a part of the signal conductor pattern 2230*b*, and a capacitor 2254*b* mounted on the signal conductor pattern 2230*b*. Further, the signal conductor pattern 2230*b* of the component mounting portion 2250*b* is formed wider than, for example, other portions.

The thin film resistor 2252*b* is formed with a portion of the signal conductor pattern 2230*b* with a desired thickness so that the portion has a desired resistance value, and is formed to be thinner than the thickness of the other portion, for example. Further, for example, the capacitor 2254*b* is a single plate capacitor, and a lower surface electrode portion of the capacitor is fixed on a wide portion of the signal conductor pattern 2230*b* connected to one end of the thin film resistor 2252*b*, for example, by soldering. On the other hand, for example, an upper surface electrode of the capacitor 2254*b* is connected over the wide portion of the signal conductor pattern 2230*b* connected to the other end of the thin film resistor 2252*b* by wire bonding using a conductor wire 2270. Thus, the component mounting portion 2250*b* constitutes an electric filter in which the thin film resistor 2252*b* and the capacitor 2254*b* are connected in parallel.

Incidentally, the DP-QPSK optical modulator as described above is often used at a transmission rate of 100 Gb/s at present, and development to expand this transmission rate to 400 Gb/s or more is also in progress. With the increase in the frequency of the modulator operation, components with excellent high-frequency characteristics can be selected as the electrical circuit elements (capacitor 2254*b* or the like) mounted on the component mounting portion 2250 as described above, or the impedance of the component mounting portion 2250 is matched with the line impedance of the signal conductor pattern 2230.

However, the component mounting portion 2250 described above may cause disturbance in a high-frequency (microwave) electrical signal propagating in the signal conductor pattern 2230 due to, for example, a difference in physical shape between the electrical circuit element and the signal conductor pattern 2230, displacement of a mounting position of the electrical circuit element, and the like. As a result, a part of the microwave electrical signal leaks from the component mounting portion 2250 and becomes a leaked microwave 2290 (FIG. 14), which can act as noise on the adjacent signal conductor pattern 2230 and the signal electrode 2212 on the optical modulation element 2202.

In particular, when the leaked microwave generated from the component mounting portion 2250 constituting the electric filter in a part of the signal conductor pattern 2230 is recombined to its own signal conductor pattern 2230 and the signal electrode 2212 of the optical modulation element 2202 connected to the signal conductor pattern 2230, not only it acts as electrical noise, but it may also cause new problems such as deteriorating or fluctuating the filter characteristics of the electric filter.

CITATION LIST

Patent Literature

[Patent Literature No. 1] Japanese Laid-open Patent Publication No. 2009-244325

[Patent Literature No. 2] Japanese Laid-open Patent Publication No. 2018-54929

SUMMARY OF INVENTION

Technical Problem

From the above background, in an optical modulator provided with an electrical circuit element such as an electric filter on a relay substrate that electrically connects the signal electrode of the optical modulation element and the signal input terminal, it is required to suppress deterioration or fluctuation of frequency characteristics (for example, high-frequency characteristics) caused by leaked microwaves that may be generated from the portion of the electrical circuit element, and to realize good modulation characteristics.

Solution to Problem

According to one aspect of the present invention, there is provided an optical modulator including: an optical modulation element that is configured to generate two modulated light beams, each of which is modulated by two sets of electrical signals, each set including two electrical signals, and that includes a plurality of signal electrodes; a plurality of signal input terminals, each of which inputs an electrical signal to be applied to each of the signal electrodes; a relay substrate on which a plurality of signal conductor patterns that electrically connect the signal input terminals to the signal electrodes and a plurality of ground conductor patterns are formed, the relay substrate being configured to propagate the two sets of electrical signals by two pairs of the signal conductor patterns, each pair being composed of two adjacent signal conductor patterns; and a housing in which the optical modulation element and the relay substrate are accommodated, in which at least one signal conductor pattern includes at least one component mounting portion including at least a parallel circuit of a resistor and a capacitor, and the relay substrate includes a metal body connected on the ground conductor pattern or a substrate removal portion from which a substrate material of the relay substrate is removed, the metal body or the substrate removal portion being provided at a position sandwiching a portion of the at least one signal conductor pattern downstream of the component mounting portion along a propagation direction of the electrical signal.

According to another aspect of the present invention, the metal body or the substrate removal portion is arranged at a distance shorter than a wavelength of a high-frequency signal which is the electrical signal, from an end of an electrical circuit element constituting the component mounting portion, along the propagation direction of the electrical signal.

According to still another aspect of the present invention, the metal body is formed higher than a height of an electrical circuit element constituting the component mounting portion.

According to still another aspect of the present invention, in the at least one signal conductor pattern, a characteristic impedance downstream of the component mounting portion along the propagation direction of the electrical signal is set lower than a characteristic impedance upstream of the component mounting portion.

According to still another aspect of the present invention, a portion where the characteristic impedance is set low is provided by forming a width of the at least one signal conductor pattern wider than a width of the signal conductor pattern in the upstream.

According to still another aspect of the present invention, the at least one signal conductor pattern has a curved portion downstream of the component mounting portion along the propagation direction of the electrical signal.

According to still another aspect of the present invention, the metal body is composed of a conductor wire, a conductor ribbon, or a conductor pin whose at least one end is connected to the ground conductor pattern.

According to still another aspect of the present invention, the substrate removal portion is a via or a through hole.

According to still another aspect of the present invention, there is provided an optical transmission apparatus including any one of the optical modulators described above and an electronic circuit that outputs an electrical signal for causing the optical modulator to perform a modulation operation.

This application claims the benefit of Japanese Patent Application No. 2019-175517 filed on Sep. 26, 2019, the disclosure of which is herein incorporated by reference in its entirety.

Advantageous Effects of Invention

According to the present invention, in an optical modulator provided with an electrical circuit element such as an electric filter on a relay substrate, it is possible to suppress electrical noise and deterioration or fluctuation of frequency characteristics caused by leaked microwaves that may be generated from portions of the electrical circuit element, and to realize good modulation characteristics.

DESCRIPTION OF EMBODIMENTS

Generally, a leaked microwave generated in a component mounting portion of a relay substrate spreads as a whole with the component mounting portion as a point wave source, but has directivity in which its intensity is concentrated in the direction along a propagation direction of a high-frequency signal of a signal conductor pattern in the component mounting portion. In embodiments of the present invention shown below, the relay substrate is provided with a recombination suppression structure for inhibiting the propagation of a leaked microwave generated from the component mounting portion and inhibiting the leaked microwave from recombination with the signal conductor pattern that was its own generation source (or into a high-frequency propagation mode propagating inside the signal conductor pattern).

These recombination suppression structures are, for example, metal wires (for example, bonding wires) and/or metal pins erected in a bridge shape on a substrate as ones for inhibiting the spatial propagation of leaked microwaves, and/or substrate removal portions (for example, vias or through holes) from which a substrate material of the relay substrate is removed so as to inhibit the propagation of the leaked microwaves in the relay substrate material. In the following description, the "(propagation) direction of the leaked microwave" refers to a direction of the directivity of the leaked microwave (that is, a direction in which the intensity of the leaked microwave is concentrated and propagates).

Hereinafter, embodiments of the present invention will be described with reference to the drawings.

First Embodiment

Figure 1:
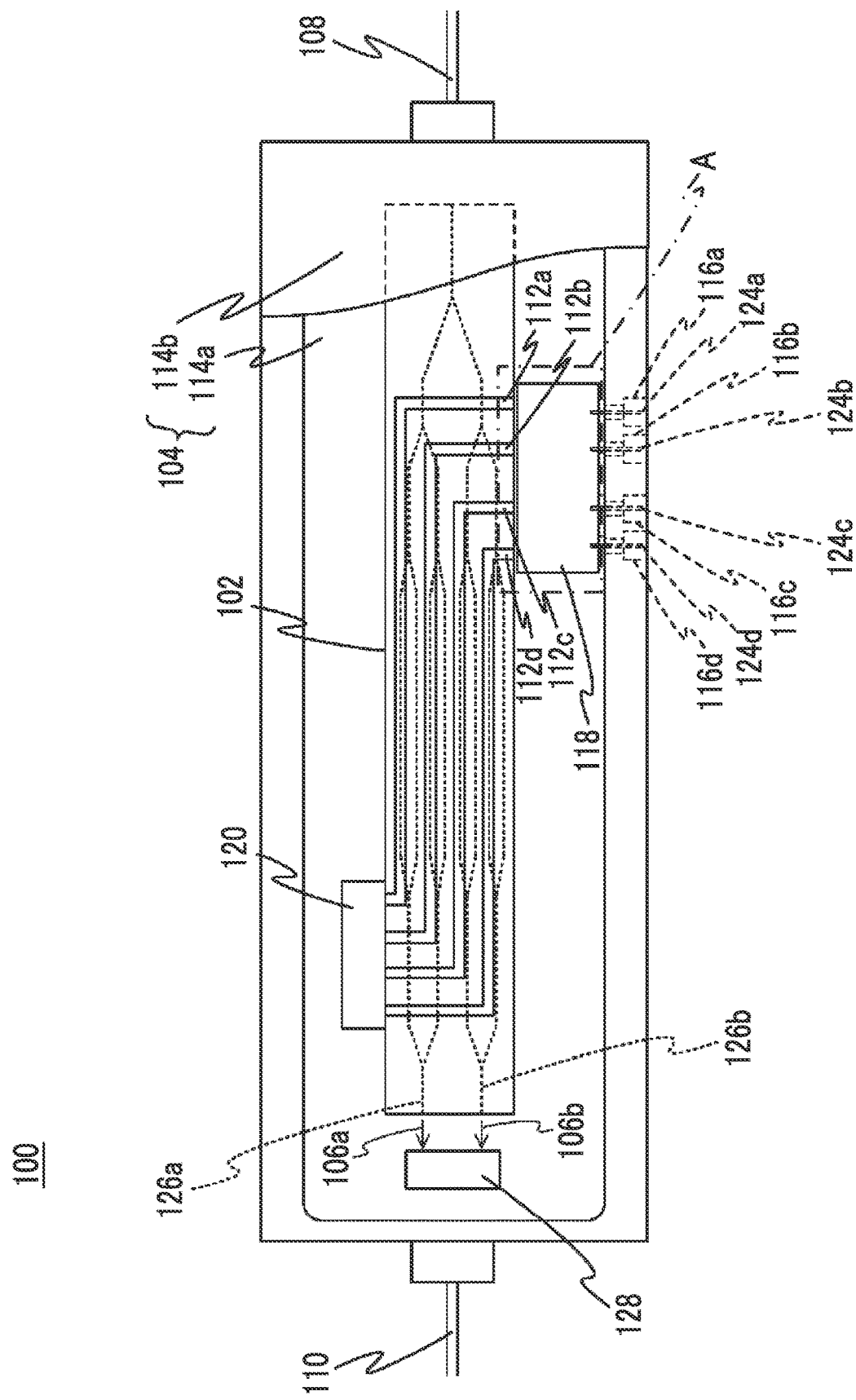
FIG. 1 is a plan view of an optical modulator according to a first embodiment of the present invention.
Figure 2:
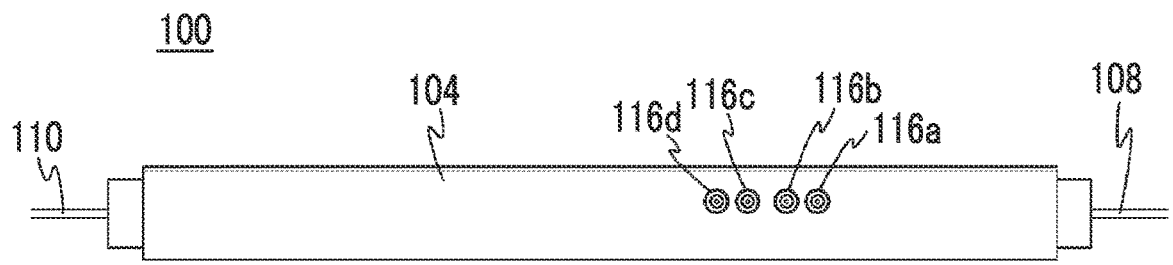
FIG. 2 is aside view of the optical modulator illustrated in FIG. 1.
Figure 3:
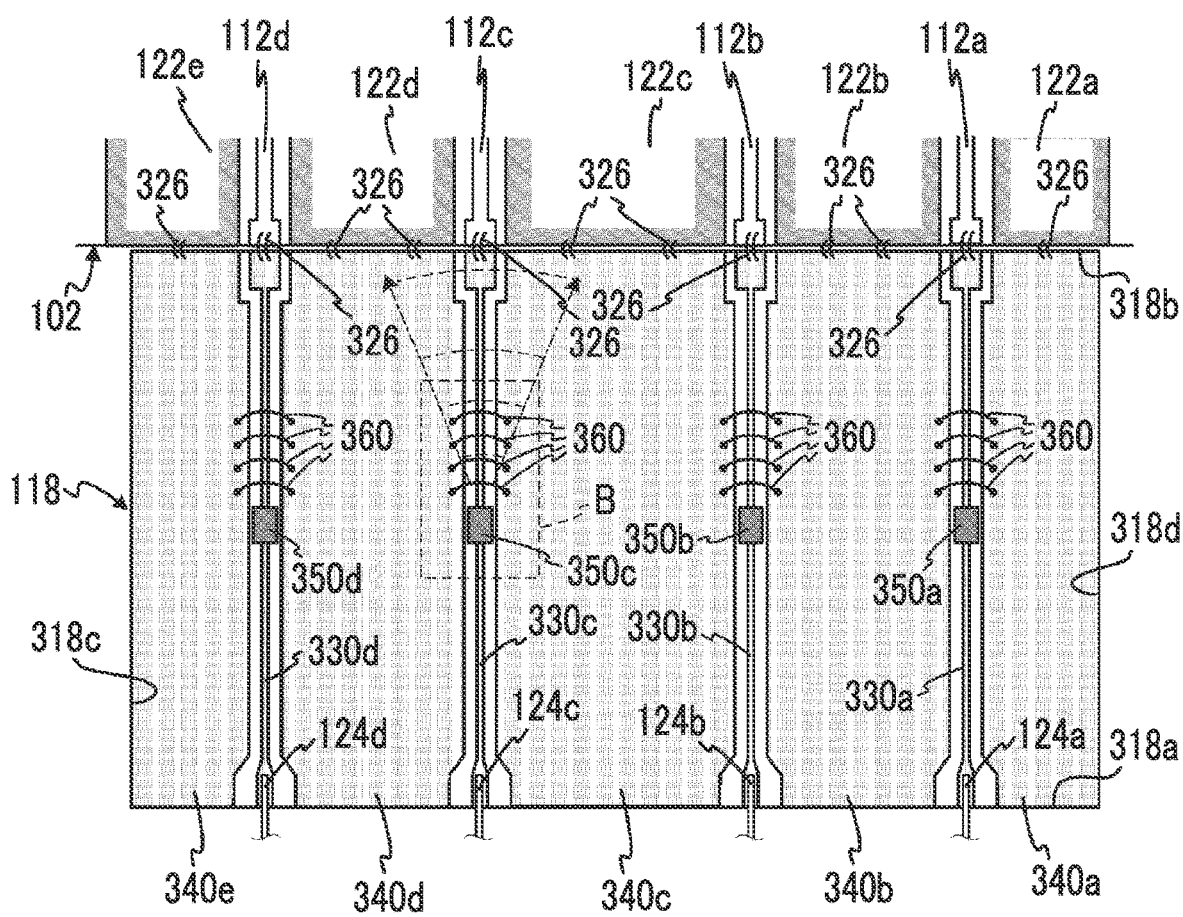
FIG. 3 is a detailed view of a part A of the optical modulator illustrated in FIG. 1.

First, a first embodiment of the present invention will be described. FIG. 1 is a plan view illustrating a configuration of an optical modulator 100 according to the first embodiment of the present invention, FIG. 2 is a side view of the optical modulator 100, and FIG. 3 is a partial detailed view of a part A in FIG. 1.

The optical modulator 100 includes an optical modulation element 102, a housing 104 in which the optical modulation element 102 is accommodated, an input optical fiber 108 for inputting light into the optical modulation element 102, and an output optical fiber 110 that guides the light output from the optical modulation element 102 to the outside of the housing 104.

The optical modulation element 102 is, for example, a DP-QPSK modulator that performs optical modulation of 400 Gb/s, and includes, for example, two nested type Mach-Zehnder optical waveguides, each of which is provided on an LN substrate, each including two Mach-Zehnder type optical waveguides. A total of four Mach-Zehnder type optical waveguides constituting these two nested type Mach-Zehnder optical waveguides are provided with four signal electrodes 112a, 112b, 112c, and 112d (hereinafter, collectively also referred to as a signal electrode 112) that respectively modulate light waves propagating through the Mach-Zehnder type optical waveguide. In addition, as known in the related art, on a surface of the LN substrate of the optical modulation element 102, for example, ground electrodes 122a, 122b, 122c, 122d, and 122e (see FIG. 3 and not illustrated in FIG. 1) are provided so that each of the four signal electrodes 112a, 112b, 112c, and 112d forms a coplanar waveguide (CPW).

Specifically, the ground electrodes 122a, 122b, 122c, 122d, and 122e (hereinafter, collectively also referred to as a ground electrode 122) are arranged to respectively sandwich the signal electrodes 112a, 112b, 112c, and 112d therebetween in a surface of the LN substrate, and constitute a coplanar waveguide having a predetermined characteristic impedance in a predetermined operating frequency together with the four signal electrodes 112a, 112b, 112c, and 112d.

Four high-frequency electrical signals (modulation signals) are respectively input to the four signal electrodes 112. These high-frequency electrical signals cooperate to control the propagation of the light wave in the four Mach-Zehnder type optical waveguides, and perform the operation of DP-QPSK modulation of 400 Gb/s as a whole.

Specifically, two pairs of high-frequency electrical signals, one pair of which includes two high-frequency electrical signals, are applied to the four respective signal electrodes 112. The optical modulation element 102 is configured to generate two modulated light beams 106a and 106b (arrows in FIG. 1) each of which is modulated by one pair of electrical signals. The two generated modulated light beams 106a and 106b are respectively output from two output optical waveguides 126a and 126b of the two nested type Mach-Zehnder optical waveguides that form the optical modulation element 102. In the present embodiment, two high-frequency electrical signals forming one pair are applied to the signal electrodes 112a and 112b to generate the modulated light 106a output from the output optical waveguide 126a, and other two high-frequency electrical signals forming another pair are applied to the signal electrodes 112c and 112d to generate the modulated light 106b output from the output optical waveguide 126b. These two modulated light beams 106a and 106b are combined into one beam by a polarization-combining part 128 including a polarization beam combining prism or the like, and then output to the outside of the housing 104 via the output optical fiber 110.

The housing 104 includes a case 114a to which the optical modulation element 102 is fixed and a cover 114b. In order to facilitate understanding of the configuration inside the housing 104, only a part of the cover 114b is illustrated on the right side in FIG. 1, but actually, the cover 114b is arranged to cover the entire box-shaped case 114a and hermetically seals the inside of the housing 104. The case 114a is made of a metal or a ceramic plated with gold, for example, and functions electrically as an electric conductor. The housing 104 can be usually provided with a plurality of pins for DC bias control or the like, which are omitted in FIG. 1.

In the case 114a, electrical connectors 116a, 116b, 116c, and 116d (hereinafter, collectively also referred to as electrical connectors 116), which are coaxial connectors including signal input terminals 124a, 124b, 124c, and 124d (hereinafter, collectively also referred to as a signal input terminal 124) that input the high-frequency electrical signal to be applied to each of the signal electrodes 112a, 112b, 112c, and 112d of the optical modulation element 102 are provided.

Each of the electrical connectors 116 is, for example, a socket for a push-on coaxial connector, including a cylindrical ground conductor, and the signal input terminal 124 includes a center conductor (core wire) extending along a center line of the cylindrical ground conductor. Each of the cylindrical ground conductors is electrically connected and fixed to the case 114a. Therefore, the case 114a constitutes a part of a ground line that supplies a ground potential. Further, each of the signal input terminals 124 is electrically connected to one end of each of the signal electrodes 112 of the optical modulation element 102, via a relay substrate 118.

The other end of the signal electrode 112 of the optical modulation element 102 is terminated by a terminator 120 having a predetermined impedance. Thus, the electrical signals input to the one ends of the signal electrodes 112 respectively propagate in the signal electrodes 112 as traveling waves.

FIG. 3 is a detailed view of a part A illustrated in FIG. 1, and illustrates a configuration of the relay substrate 118 and its surroundings. On the relay substrate 118, signal conductor pattern 330a, 330b, 330c, and 330d (hereinafter, collectively also referred to as a signal conductor pattern 330) and ground conductor pattern 340a, 340b, 340c, 340d, and 340e (hereinafter, collectively also referred to as a ground conductor pattern 340) are formed.

The signal conductor patterns 330a, 330b, 330c, and 330d connect the signal electrodes 112a, 112b, 112c, and 112d, respectively, and the corresponding signal input terminals 124, respectively. In particular, one pair of high-frequency electrical signals that generate the modulated light 106a are given to the signal electrodes 112a and 112b via the signal conductor patterns 330a and 330b adjacent to each other. Further, the other pair of high-frequency electrical signals that generate the modulated light 106b are given to the signal electrodes 112d and 112d via the signal conductor patterns 330c and 330d adjacent to each other. That is, the signal conductor patterns 330a and 330b form one pair of signal conductor patterns and propagate one pair (set) of high-frequency electrical signals, and the signal conductor patterns 330c and 330d form the other pair of signal conductor patterns and propagate the other pair (set) of high-frequency electrical signals.

On the relay substrate 118, a rear surface ground conductor (not illustrated) is formed on, for example, the entire surface of a rear surface facing a front surface (a surface illustrated in FIG. 3 in which the signal conductor pattern 330 and the ground conductor pattern 340 are formed). The rear surface ground conductor is fixed to the case 114a of the housing 104 with, for example, solder, a brazing material, a conductive adhesive, or the like. Thus, the rear surface ground conductor becomes a ground line component. Each of the ground conductor patterns 340 is connected to the rear surface ground conductor and connected to the ground line through an appropriate via (not illustrated).

The ground conductor patterns 340a, 340b, 340c, 340d, and 340e are respectively provided to sandwich the signal conductor patterns 330a, 330b, 330c, and 330d in a front surface of the relay substrate 118. Thus, each of the signal conductor patterns 330 and the ground conductor pattern 340 form a coplanar waveguide.

In the present embodiment, the signal conductor pattern 330 extends in an upward-downward direction illustrated in FIG. 3, and among sides of the relay substrate 118, one end of a side on a lower side illustrated in FIG. 3 is connected to the signal input terminal 124. Here, among the sides of the relay substrate 118, a side on which the signal conductor pattern 330 and the signal input terminal 124 are connected is referred to as a signal input side 318a.

Each of the signal electrodes 112 of the optical modulation element 102 is electrically connected to another end of the signal conductor pattern 330 of the relay substrate 118, on an upper side illustrated in FIG. 3 among sides of the relay substrate 118, by wire bonding using a conductor wire 326, for example. The conductor wire 326 can be a metal wire (for example, a gold (Au) wire). Here, among the sides of the relay substrate 118, a side on which the signal conductor pattern 330 and the signal electrode 112 of the optical modulation element 102 are connected is referred to as a signal output side 318b. In the present embodiment, the signal input side 318a and the signal output side 318b form two sides facing each other in the relay substrate 118 in a plan view. Among the sides of the relay substrate 118 in FIG. 3, the other two sides facing each other, other than the signal input side 318a and the signal output side 318b are referred to as side edges (lateral sides) 318c and 318d.

In the optical modulation element 102, the respective ground electrodes 122 that constitute the coplanar waveguide together with the signal electrodes 112 are electrically connected to one ends of the respective ground conductor patterns 340 at the signal output side 318b of the relay substrate 118, by wire bonding using the conductor wires 326, for example, in the same manner as described above. The wire bonding using the conductor wire 326 described above is an example, and the present invention is not limited thereto. Instead of wire bonding of the conductor wire 326, for example, ribbon bonding using a conductor ribbon such as a metal ribbon (for example, a gold (Au) ribbon) can be used.

The signal conductor patterns 330a, 330b, 330c, and 330d include, for example, component mounting portions 350a, 350b, 350c, and 350d (hereinafter, collectively also referred to as a component mounting portion 350) which are portions (dark shaded portions illustrated in FIG. 3) provided with an electrical circuit element constituting an electric filter (a band-pass filter, a high-pass filter, and the like), respectively. Here, the electrical circuit element refers to an active element and/or a passive element serving as a functional element constituting the circuit, and does not include a wire pattern or a land (solder) provided exclusively for electrical connection. The component mounting portion 350 may be configured to include at least a parallel circuit of a resistor and a capacitor, for example.

Figure 4:
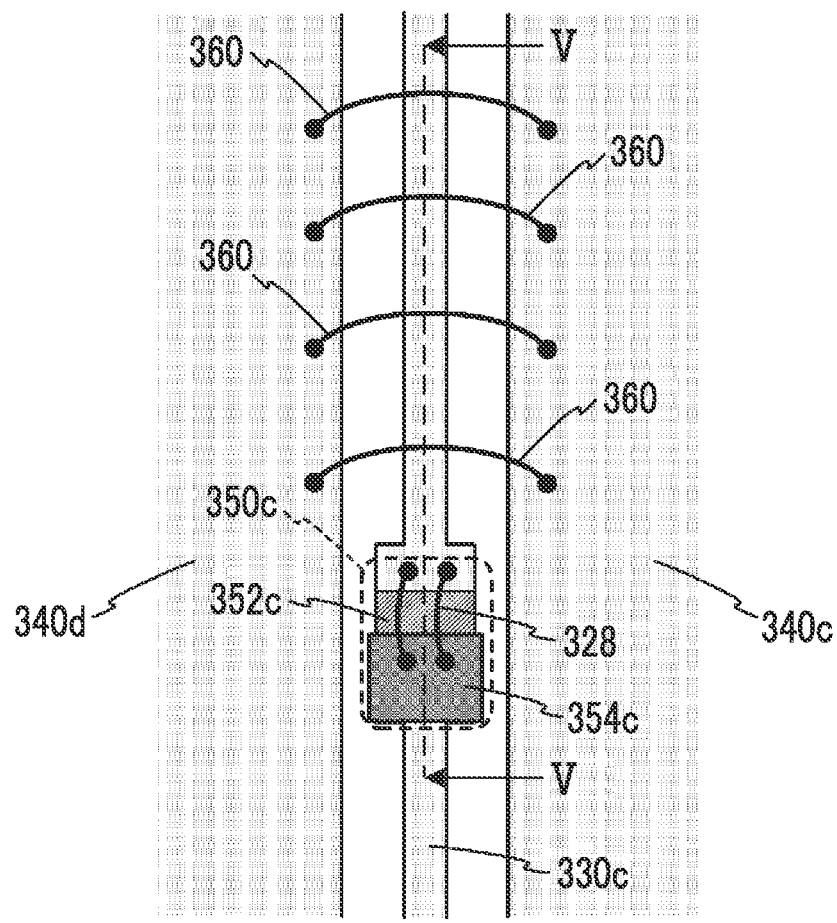
FIG. 4 is a partial detailed view of a part B illustrated in FIG. 3.

FIG. 4 is a partial detailed view of a part B illustrated in FIG. 3, which illustrates the configuration of the component mounting portion 350c and its periphery. It should be understood that the component mounting portion 350c illustrated in FIG. 4 is an example, and the configurations of the other component mounting portions 350a, 350b, and 350d and their peripheries are the same as those in FIG. 4.

For example, similar to the component mounting portion 2250 illustrated in FIGS. 18 to 21 as an example, the component mounting portion 350c is an electric filter configured by mounting an electrical circuit element such as a capacitor and/or forming an electrical circuit element such as a thin film resistor on a portion of the signal conductor pattern 330c provided wider than the others. This electric filter may be, for example, a band-pass filter, a high-frequency transmission filter, or a low-frequency transmission filter. However, it is an example that the signal conductor pattern 330 is formed wide in the component mounting portion 350, and the signal conductor pattern 330 of the component mounting portion 350 can be formed in the same width as the others.

Specifically, the component mounting portion 350c includes a thin film resistor 352c formed in a wide portion of the signal conductor pattern 330c and a capacitor 354c mounted in the wide portion. The capacitor 354c is, for example, a single plate capacitor, and a lower surface electrode portion of the capacitor is fixed on a wide portion of the signal conductor pattern 330c connected to one end of the thin film resistor 352c, for example, by soldering. On the other hand, an upper surface electrode of the capacitor 354c is connected over the wide portion of the signal conductor pattern 330c connected to the other end of the thin film resistor 352c, for example, by wire bonding using a conductor wire 328. Thus, the component mounting portion 350c constitutes an electric filter (RC filter) in which the thin film resistor 352c and the capacitor 354c are connected in parallel. Here, the area of the component mounting portion 350c can be, for example, an area from the position of the left end surface of the capacitor 354c illustrated in FIG. 5 to the position on the signal conductor pattern 330c to which the conductor wire 328 is connected.

Then, in the present embodiment, in particular, in the relay substrate 118, four conductor wires 360 erected in a bridge shape straddling the signal conductor pattern 330 by connecting two adjacent ground conductor patterns 340 are arranged in a portion of the signal conductor pattern 330 downstream of the component mounting portion 350 along the propagation direction of the electrical signal. Here, the conductor wires 360 corresponds to, for example, a metal body that does not form an electric circuit and is provided at a position sandwiching a portion of the signal conductor pattern 330 downstream of the component mounting portion 350 along the propagation direction of the electrical signal. The conductor wire 360, which is such a metal body, absorbs the leaked microwave generated from the component mounting portion 350 and propagates in the space, and functions as a shield against the leaked microwave.

Thus, in the present embodiment, for example, recombination of leaked microwaves generated from the component mounting portion 350c provided in the signal conductor pattern 330c and propagated in the air toward the downstream direction (for example, leaked microwaves propagating in an area sandwiched by two alternate long and short dash arrows extending from the component mounting portion 350c in FIG. 3) to the signal conductor pattern 330c (or into a propagation mode of the electrical signal propagating inside the signal conductor pattern 330c) can be suppressed. That is, the conductor wire 360, which is the metal body, corresponds to the recombination suppression structure described above. The metal body functions as a recombination suppression structure that inhibits the propagation of leaked microwaves generated from the component mounting portion 350 and suppresses recombination, and does not include, for example, the conductor wire 326 or a conductor ribbon connecting the ground electrode 122 of the optical modulation element 102 and the ground conductor pattern 340 of the relay substrate 118 or the like.

Therefore, in the optical modulator 100, it is possible to avoid changing (deteriorating) or fluctuating the frequency characteristics of the signal conductor pattern 330 including the component mounting portion 350 as a whole, for example, with respect to the design frequency characteristics of the component mounting portion 350 constituting the electric filter. As a result, in the optical modulator 100, good optical modulation characteristics can be realized with the frequency characteristics of each of the signal conductor patterns 330 as a whole including the component mounting portion 350 as a desired characteristic. Such an effect of improving the optical modulation characteristics by stabilizing the frequency characteristics of the signal conductor pattern is particularly remarkable in an optical modulator configured to generate two modulated light beams, each of which is modulated by a total of two sets of electrical signals, including two electrical signals per set, such as, for example, the optical modulator 100 that performs DP-QPSK modulation according to the present embodiment. This is because in such a modulator, the frequency fluctuation in one signal conductor pattern has a large influence on the optical modulation characteristics of the optical modulator as a whole, as compared with other types of optical modulators.

Figure 5:
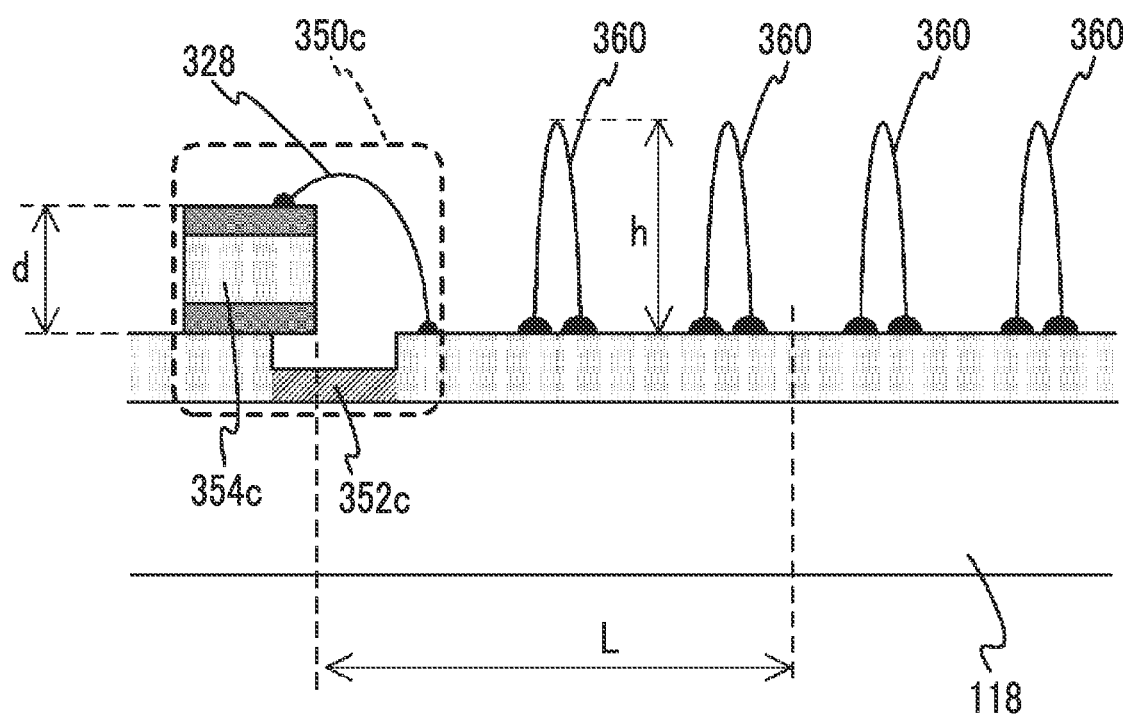
FIG. 5 is a cross-sectional view taken along arrow line V-V of the partial detailed part illustrated in FIG. 4.

Here, from the viewpoint of effectively avoiding the recombination of the leaked microwave generated from the component mounting portion 350 to its own signal conductor pattern 330, as illustrated in FIG. 5, it is desirable that at least one conductor wire 360 is provided within a predetermined distance L from the generation point of the leaked microwave in the component mounting portion 350. From the viewpoint of avoiding the recombination, the distance L is desirably equal to or less than a length of several wavelengths (for example, five times the wavelength) of the center wavelength of the high-frequency electrical signal propagating in the signal conductor pattern 330, and is more desirably a length within one wavelength. This center wavelength is, for example, a value of about 3 mm when the center frequency of the high-frequency electrical signal is 100 GHz. The point where the leaked microwave is generated can be one end of any of the electrical circuit elements constituting the component mounting portion 350 (for example, the right end of the capacitor 354c which is a single plate capacitor of the component mounting portion in FIG. 5). In a modulator that performs modulation operation of 400 Gb/s or more, the distance L is desirably 6 mm or less, and more preferably 3 mm or less.

Further, from the viewpoint of suppressing recombination, as illustrated in FIG. 5, it is desirable that a height h of the conductor wire 360 erected from the ground conductor pattern 340 is equal to or higher than the height of the electrical circuit element constituting the component mounting portion 350 (for example, a height d of the capacitor 354c in the present embodiment). For example, the conductor wire 360 can be erected at a height of about 100 μm to several hundred μm with respect to the general thickness of 100 μm of the single plate capacitor used in this application.

In the present embodiment, the conductor wire 360, which is a metal body, electrically connects two adjacent ground conductor patterns 340 sandwiching the signal conductor pattern 330 in the portion downstream of the component mounting portion 350 in the signal conductor pattern 330, and is erected in a bridge shape. However, the present invention is not limited thereto. The conductor wire 360 does not necessarily have to be erected in a bridge shape, and as long as it is arranged at a position sandwiching a portion downstream of the component mounting portion 350, only one end of the conductor wire 360 can be connected and fixed to the ground conductor pattern 340 and erected in a columnar shape from the surface of the relay substrate 118. Even with this configuration, by erecting a plurality of conductor wires 360 so as to sandwich the downstream portion, for example, at a frequency determined by the clearance between the conductor wires 360, the propagation of the leaked microwave can be shielded and the change or fluctuation of the frequency characteristic can be suppressed.

Further, in the present embodiment, four conductor wires 360, which are metal bodies, are provided for each of the signal conductor patterns 330 at substantially equal clearances as illustrated in FIGS. 3 and 4, but the present invention is not limited thereto. The number of conductor wires 360 can be smaller or larger, depending on the degree of fluctuation in frequency characteristics associated with the recombination of leaked microwaves, and the plurality of conductor wires 360 can be provided at unequal clearances. Of course, in this case, the fluctuation of the frequency characteristic caused by the leaked microwave can be further suppressed as the number of the conductor wires 360 increases.

The conductor wire 360 can be a metal wire (for example, a gold (Au) wire) or the like. Further, instead of the conductor wire 360, a conductor ribbon such as a metal ribbon (gold (Au) ribbon) may be used.

Next, a modification example of the relay substrate used in the optical modulator 100 according to the present embodiment will be described.

First Modification Example of First Embodiment

Figure 6:
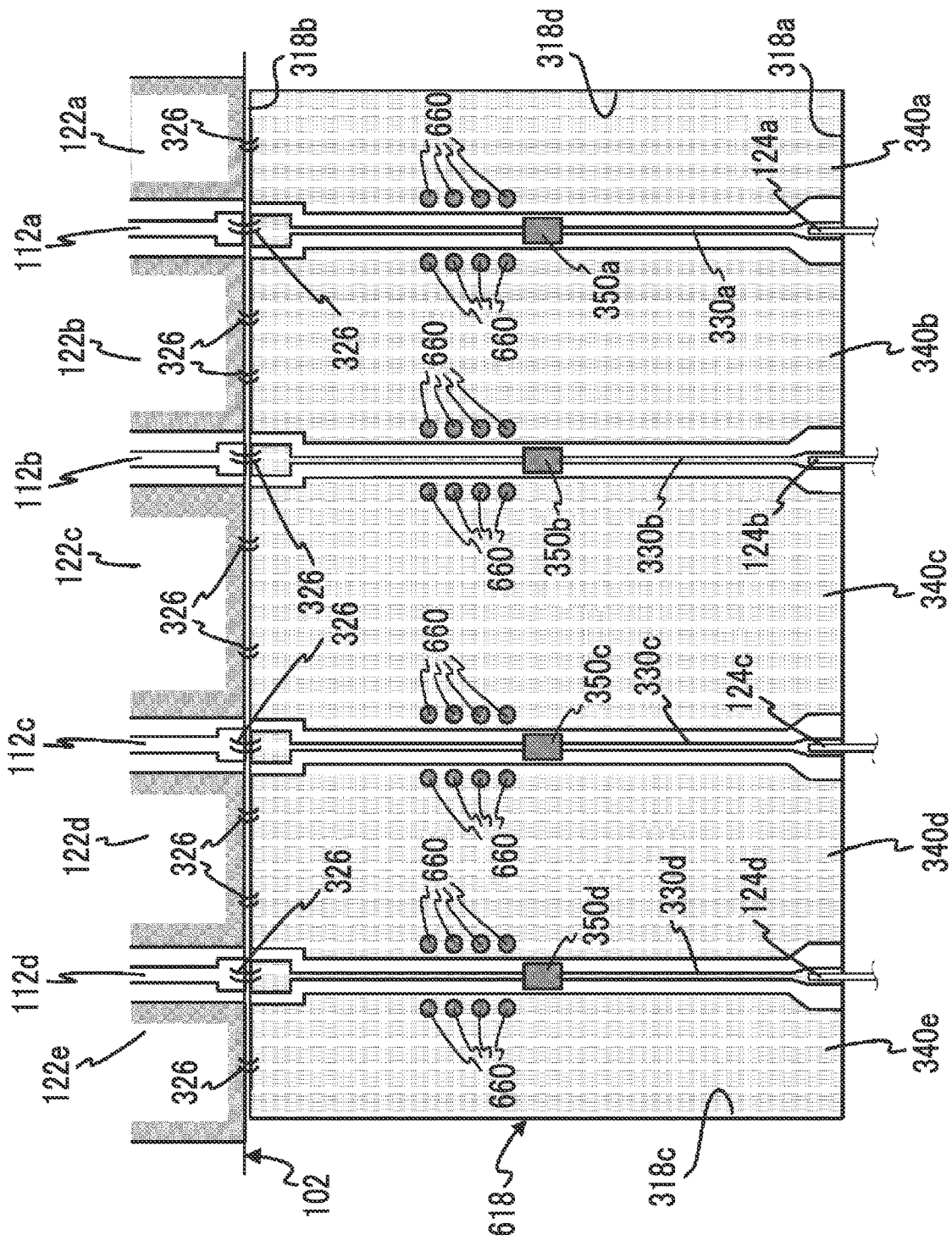
FIG. 6 is a diagram illustrating a configuration of a relay substrate according to a first modification example of the optical modulator according to the first embodiment.

FIG. 6 is a diagram illustrating a configuration of a relay substrate 618 according to a first modification example of the first embodiment, and is a diagram corresponding to the partial detailed view of the first embodiment illustrated in FIG. 3. The relay substrate 618 can be used instead of the relay substrate 118 in the optical modulator 100 illustrated in FIG. 1. In FIG. 6, the same reference numerals as those in FIG. 3 are used for the same components as those of the components of the relay substrate 118 illustrated in FIG. 3, and the above description of FIG. 3 will be incorporated herein.

The relay substrate 618 has the same configuration as the relay substrate 118 illustrated in FIG. 3, but is different from the relay substrate 118 in that conductor pins 660 are arranged instead of the conductor wires 360. That is, in a portion of the signal conductor pattern 330 downstream of the component mounting portion 350 along the propagation direction of the electrical signal propagating in the signal conductor pattern 330, four conductor pins 660 are arranged at positions of two adjacent ground conductor patterns 340 sandwiching the portion, respectively. The conductor pin 660 can be a metal pin (for example, a stainless steel pin). Here, the conductor pin 660 corresponds to a metal body that does not form an electric circuit and is provided at the ground conductor patterns 340a and 340b of the signal conductor pattern 330 that sandwich a portion downstream of the component mounting portion 350 along the propagation direction of the electrical signal.

Similar to the conductor wire 360 in the relay substrate 118 illustrated in FIG. 3, the conductor pin 660 functions as a shield against leaked microwaves generated from the component mounting portion 350 and propagating in space, and can prevent the leaked microwave from propagating and recombination to its own signal conductor pattern 330. Thus, even in the relay substrate 618, it is possible to suppress the frequency characteristics of the signal conductor pattern 330 as a whole including the component mounting portion 350 from fluctuating due to the recombination of the leaked microwaves, and realize good optical modulation characteristics. The shape of the conductor pin 660 may be a straight line, a curved line, or a bent shape as long as it has a shielding function.

Second Modification Example of First Embodiment

Next, a second modification example of the relay substrate used in the optical modulator 100 will be described.

Figure 7:
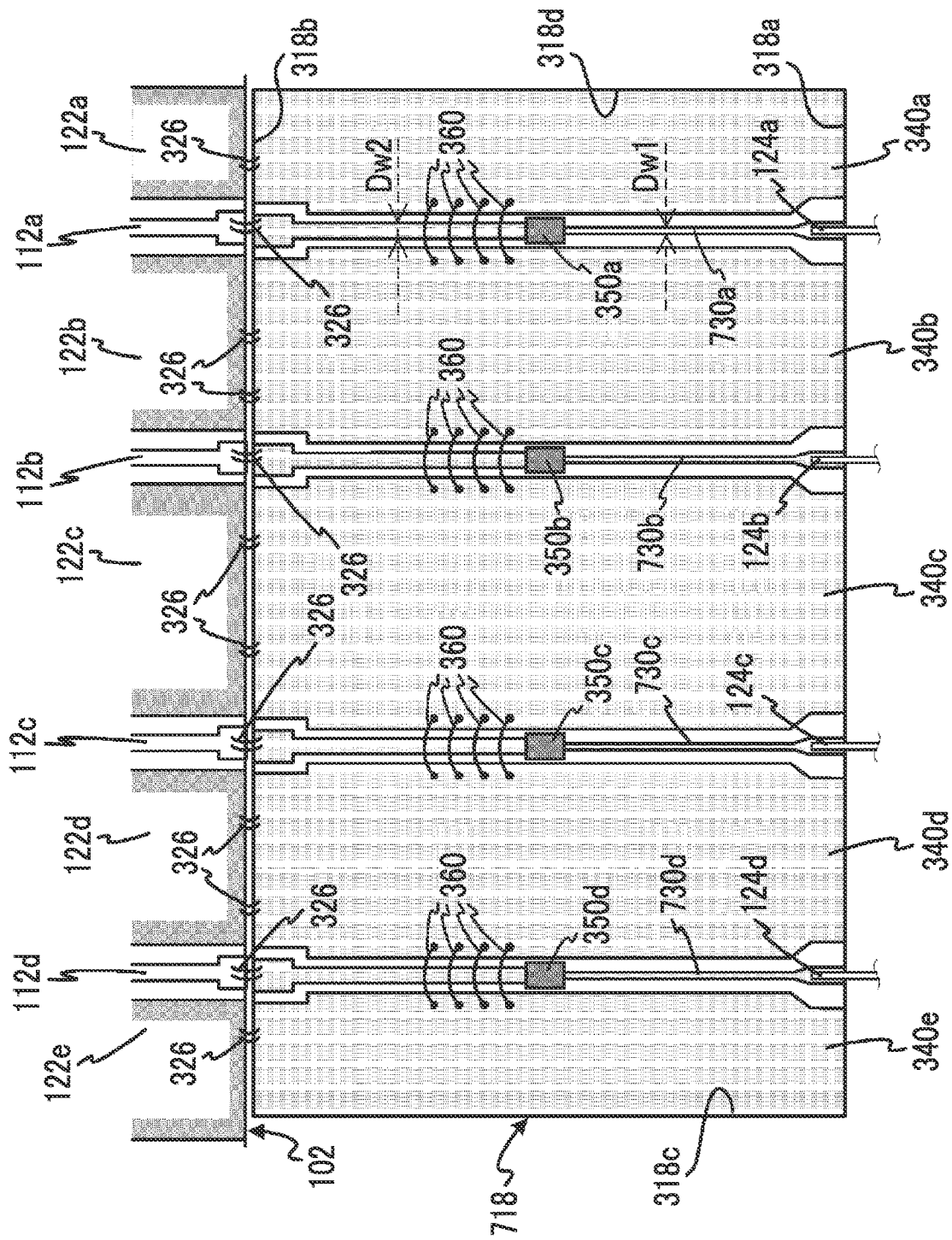
FIG. 7 is a diagram illustrating a configuration of a relay substrate according to a second modification example of the optical modulator according to the first embodiment.

FIG. 7 is a diagram illustrating a configuration of a relay substrate 718 according to the second modification example of the first embodiment, and is a diagram corresponding to the partial detailed view of the first embodiment illustrated in FIG. 3. The relay substrate 718 can be used instead of the relay substrate 118 in the optical modulator 100 illustrated in FIG. 1. In FIG. 7, the same reference numerals as those in FIG. 3 are used for the same components as those of the relay substrate 118 illustrated in FIG. 3, and the above description of FIG. 3 will be incorporated herein.

The relay substrate 718 has the same configuration as the relay substrate 118 illustrated in FIG. 3, but is different from the relay substrate 118 in that it includes signal conductor patterns 730a, 730b, 730c, and 730d (hereinafter, collectively also referred to as a signal conductor pattern 730) instead of the signal conductor patterns 330a, 330b, 330c, and 330d. The signal conductor pattern 730 has the same configuration as the signal conductor pattern 330, but is different from the signal conductor pattern 330 in that, along the propagation direction of the electrical signal from the signal input terminal 124 to the signal electrode 112, a width Dw2 of the portion downstream of the component mounting portion 350 is formed wider than a width Dw1 of the upstream portion of the component mounting portion 350.

Thus, in the signal conductor pattern 770, the characteristic impedance in the downstream is lower than the characteristic impedance in the upstream, and the confinement strength of the high-frequency electrical signal in the signal conductor pattern 770 becomes stronger in the downstream than in the upstream. Therefore, in the portion of the signal conductor pattern 730 downstream of the component mounting portion 350, the separability between a high-frequency electrical signal propagating in the signal conductor pattern 730 (hereinafter also referred to as a propagated microwave) and the leaked microwave (difficulty in coupling a leaked microwave to a propagated microwave) is improved. Therefore, in the relay substrate 718, as compared with the relay substrate 118 illustrated in FIG. 3, the leaked microwave generated from the component mounting portion 350 can be further suppressed from being recombined to the signal conductor pattern 730 in the downstream portion, and fluctuations in the frequency characteristics of the entire signal conductor patterns 730 can be further suppressed. As a result, in the relay substrate 718, it is possible to realize better optical modulation characteristics than the relay substrate 118.

Third Modification Example of First Embodiment

Next, a third modification example of the relay substrate used in the optical modulator 100 will be described.

Figure 8:
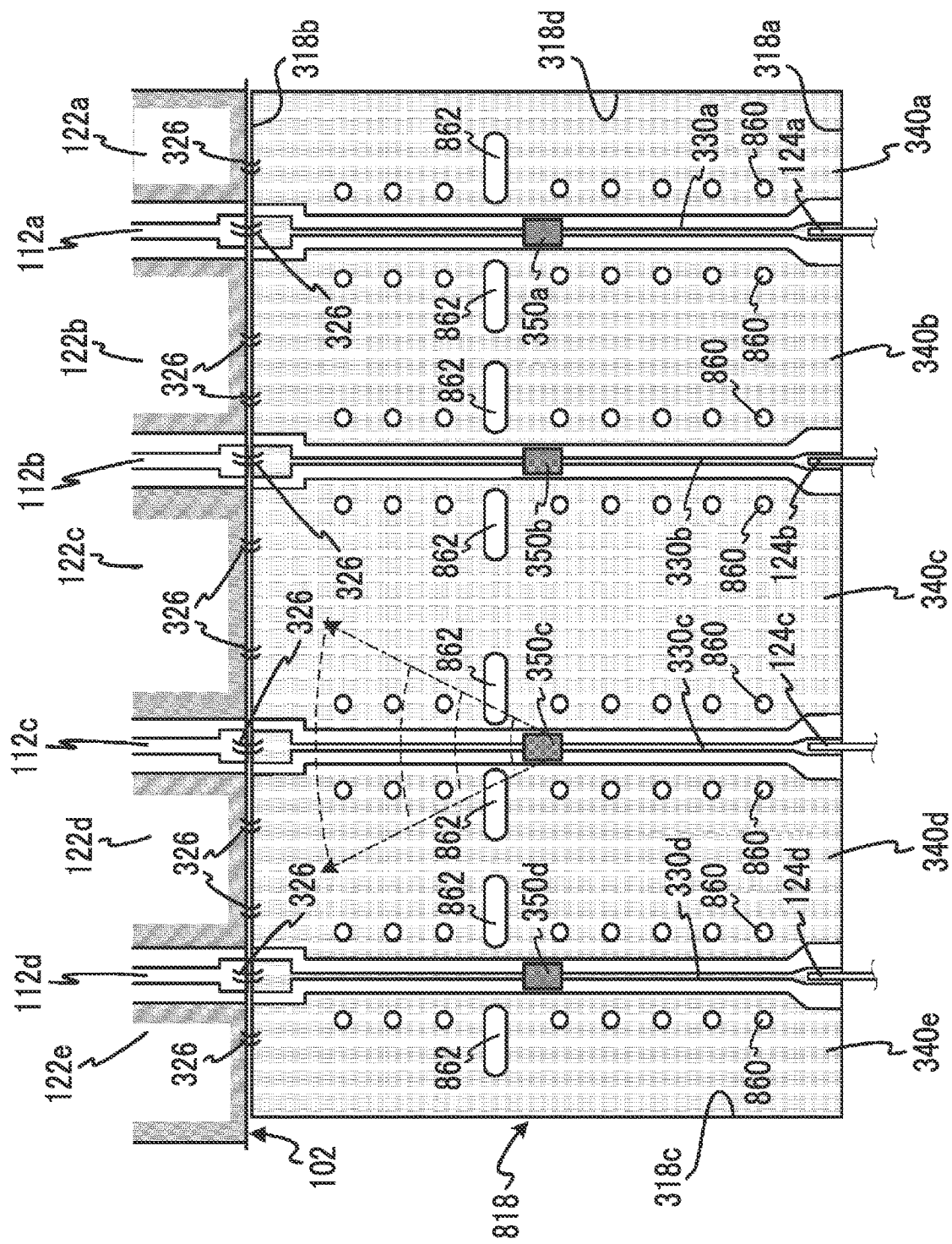
FIG. 8 is a diagram illustrating a configuration of a relay substrate according to a third modification example of the optical modulator according to the first embodiment.

FIG. 8 is a diagram illustrating a configuration of a relay substrate 818 according to the third modification example of the first embodiment, and is a diagram corresponding to the partial detailed view of the first embodiment illustrated in FIG. 3. The relay substrate 818 can be used instead of the relay substrate 118 in the optical modulator 100 illustrated in FIG. 1. In FIG. 8, the same reference numerals as those in FIG. 3 are used for the same components as those of the relay substrate 118 illustrated in FIG. 3, and the above description of FIG. 3 will be incorporated herein.

The relay substrate 818 has the same configuration as the relay substrate 118 illustrated in FIG. 3, but the ground conductor pattern 340 is provided with a via 860 for electrically connecting to a ground conductor (not illustrated) provided on the rear surface (the surface facing the surface illustrated in FIG. 8) of the relay substrate 818. Here, in FIG. 8, in order to avoid duplication of description, reference numeral 860 is attached only to the vias arranged at the lowermost side in FIG. 8, but it should be understood that circles of the same size along the signal conductor pattern 330 are similar vias 860.

Unlike the relay substrate 118, the relay substrate 818 does not have the conductor wires 360 which are metal bodies, and has substrate removal portions 862 from which the substrate material of the relay substrate 818 is removed. The substrate removal portions 862 are arranged on two adjacent ground conductor patterns 340 that sandwich a portion downstream of the component mounting portion 350 along the propagation direction of each electrical signal for each of the signal conductor patterns 330. Here, in the present modification example, the substrate removal portion 862 is provided as a through hole having an oval shape in a plan view, which penetrates the relay substrate 818 in the thickness direction thereof.

In the relay substrate 818, the substrate removal portion 862 suppresses leaked microwaves generated from the component mounting portion 350c provided in the signal conductor pattern 330c from propagating in the substrate material of the relay substrate 818 toward the downstream direction (for example, propagating in an area sandwiched by two alternate long and short dash arrows extending from the component mounting portion 350c in FIG. 8). That is, the substrate removal portion 862 functions as a recombination suppression structure, and suppresses the leaked microwave propagating in the relay substrate 818 from recombination to its own signal conductor pattern 330 (or into a propagation mode of the electrical signal propagating inside the signal conductor pattern 330). As a result, in the relay substrate 818, it is possible to prevent the frequency characteristics of the signal conductor pattern 330 as a whole including the component mounting portion 350 from fluctuating or deteriorating due to the recombination of the leaked microwaves, and realize good optical modulation characteristics.

From the viewpoint of effectively suppressing the propagation of the leaked microwave, similar to the conductor wire 360 in the relay substrate 118, it is desirable that at least a part of the substrate removal portion 862 is provided within a predetermined distance L from the generation point of the leaked microwave in the component mounting portion 350 (for example, the end of the capacitor 354c, which is a single plate capacitor). From the viewpoint of avoiding the recombination, the distance L is desirably equal to or less than a length of several wavelengths (for example, five wavelengths) of the center wavelength in the substrate material of the relay substrate 818 of the high-frequency electrical signal propagating in the signal conductor pattern 330, and is more desirably a length within one wavelength.

Further, in the present modification example, the substrate removal portion 862 has an oval shape in a plan view, but the present invention is not limited thereto. The shape of the substrate removal portion 862 in a plan view may be a circular shape or any other shape. Further, from the viewpoint of effectively suppressing the propagation of leaked microwaves, it is preferable that the substrate removal portion 862 is filled with a metal or a metal film is formed on the inner surface thereof. For example, the substrate removal portion 862 may be a via or a through hole.

Further, in the present modification example, the substrate removal portion 862 is a through hole, but the present invention is not limited thereto. The substrate removal portion 862 may have a concave shape in which the substrate material is removed halfway in the thickness direction of the relay substrate 818, instead of a through hole. Even in this case, the propagation of the leaked microwave can be inhibited to some extent in the portion where the substrate is removed.

From the viewpoint of effectively suppressing the propagation of the leaked microwave, the size of the substrate removal portion 862 is preferably as long as the length measured along the direction orthogonal to the propagation direction of the leaked microwave is longer. For example, the size of the substrate removal portion 862 is desirable that the length measured along the direction of the longest length in a plan view (for example, the length of the major axis in an oval) (hereinafter referred to as the maximum length) is larger than the diameter of the via or through hole provided in the portion of the ground conductor pattern 340 on the upstream side of the component mounting portion 350 along the propagation direction of the electrical signal.

In the relay substrate, vias and through holes used for the purpose of electrically connecting the conductor patterns on the front surface and the rear surface are generally formed in a circular shape from the viewpoint of ease of substrate production and the like. On the other hand, it is desirable that the substrate removal portion 862 has a large aspect ratio for the maximum length (ratio of the minor axis to the maximum length) in order to inhibit the leaked microwaves diffused inside the substrate of the relay substrate as widely as possible, but the aspect ratio may be larger than 1 and about 10 or less due to the relationship such as the substrate strength or the adjacent conductor patterns.

Further, in the present modification example, each of the substrate removal portions 862 is provided as one hole having an oval shape in a plan view, but the present invention is not limited thereto. The substrate removal portion 862 may be configured as, for example, an arrangement of a plurality of holes having a circular shape in a plan view. In this case, the clearance between adjacent holes constituting the arrangement is desirably 5 times or less the diameter of the holes, and more preferably 2 times or less. Further, when the substrate removal portion 862 is configured as a two-dimensional arrangement of the holes, it is desirable that the holes are arranged so as to overlap each other when viewed from the component mounting portion 350 closest to the two-dimensional arrangement of the holes.

Further, in the present modification example, two substrate removal portions 862 are provided for each signal conductor pattern 330, but the present invention is not limited thereto. Adjacent substrate removal portions 862 may be connected to form one substrate removal portion. For example, in FIG. 8, the substrate material between the two substrate removal portions 862 provided in the ground conductor pattern 340b may be further removed, and these two substrate removal portions 862 may be connected to form one oval through hole. The direction of the maximum length of the substrate removal portion 862 having an oval shape may be along a direction orthogonal to the propagation direction of the leaked microwave, or may not be along the orthogonal direction. For example, in FIG. 8, the substrate removal portion 862 may be provided at an angle so that the direction of its maximum length is perpendicular to the leaked microwave propagating in the direction of the arrow indicated by the alternate long and short dash line.

Fourth Modification Example of First Embodiment

Next, a fourth modification example of the relay substrate used in the optical modulator 100 will be described.

Figure 9:
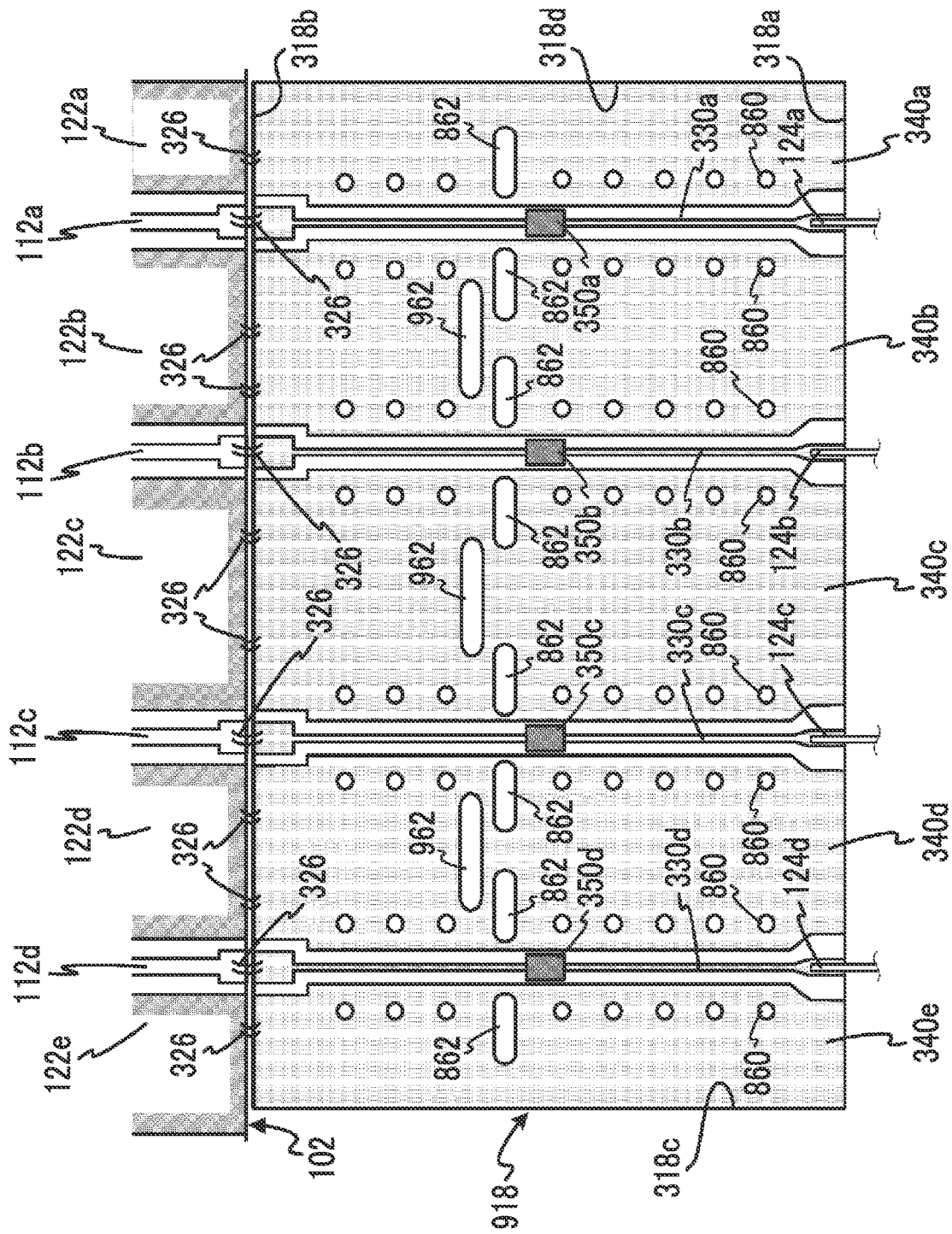
FIG. 9 is a diagram illustrating a configuration of a relay substrate according to a fourth modification example of the optical modulator according to the first embodiment.

FIG. 9 is a diagram illustrating a configuration of a relay substrate 918 according to the fourth modification example of the first embodiment, and is a diagram corresponding to the partial detailed view of the first embodiment illustrated in FIG. 3. The relay substrate 918 can be used instead of the relay substrate 118 in the optical modulator 100 illustrated in FIG. 1. In FIG. 9, the same reference numerals as those in FIGS. 3 and 8 are used for the same components as those of the components of the relay substrates 118 and 818 illustrated in FIGS. 3 and 8, and the above descriptions of FIGS. 3 and 8 will be incorporated herein.

The relay substrate 918 has the same configuration as the relay substrate 818 illustrated in FIG. 8, but is different from the relay substrate 818 in that it further includes a substrate removal portion 962. Each of the substrate removal portions 962 has the same configuration as the substrate removal portion 862, and is arranged at a position to fill a gap (more specifically, a gap seen from the component mounting portion 350) between two substrate removal portions 862 adjacent to each other.

Thus, in the relay substrate 918, since the substrate removal portion 962 can inhibit the leaked microwaves that pass through the gap between the substrate removal portions 862 and propagate in the substrate material of the relay substrate 818, it is possible to further suppress the recombination of leaked microwaves and to realize good optical modulation characteristics as compared with the relay substrate 818.

Fifth Modification Example of First Embodiment

Next, a fifth modification example of the relay substrate used in the optical modulator 100 will be described.

Figure 10:
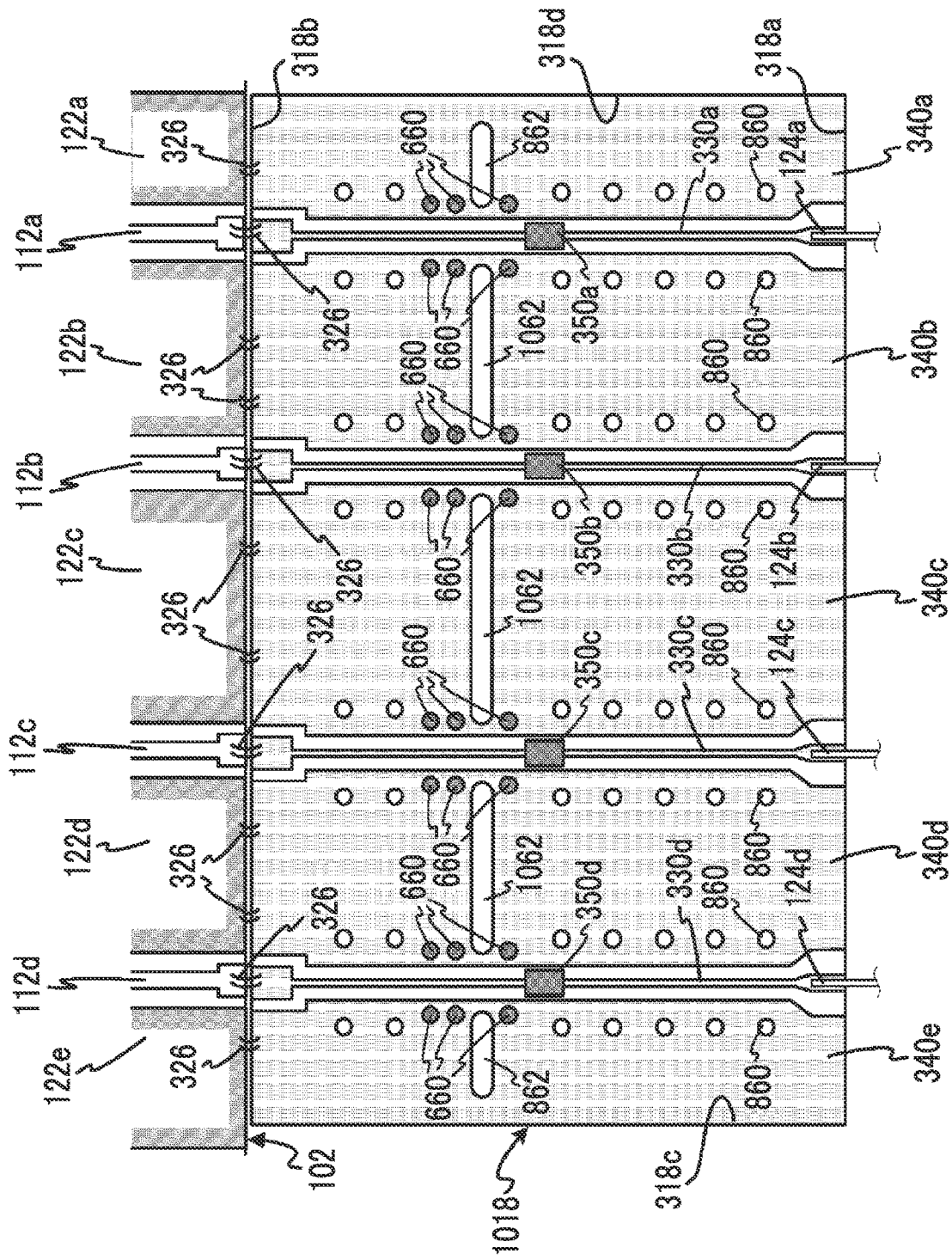
FIG. 10 is a diagram illustrating a configuration of a relay substrate according to a fifth modification example of the optical modulator according to the first embodiment.

FIG. 10 is a diagram illustrating a configuration of a relay substrate 1018 according to the fifth modification example of the first embodiment, and is a diagram corresponding to the partial detailed view of the first embodiment illustrated in FIG. 3. The relay substrate 1018 can be used instead of the relay substrate 118 in the optical modulator 100 illustrated in FIG. 1. In FIG. 10, the same reference numerals as those in FIGS. 3, 6, and 8 are used for the same components as those of the components of the relay substrates 118, 618, and 818 illustrated in FIGS. 3, 6, and 8, and the above descriptions of FIGS. 3, 6, and 8 will be incorporated herein.

The relay substrate 1018 has the same configuration as the relay substrate 818 illustrated in FIG. 8, but is different from the relay substrate 818 in that substrate removal portions 1062 are arranged in the ground conductor patterns 340b, 340c, and 340d instead of the substrate removal portions 862. Further, similar to the relay substrate 618 illustrated in FIG. 6, in the relay substrate 1018, conductor pins 660 are provided in portions of two ground conductor patterns 340 that sandwich a portion of the signal conductor pattern 330 downstream of the component mounting portion 350 along the propagation direction of the electrical signal.

Thus, in the relay substrate 1018, both the leaked microwave generated from the component mounting portion 350 and propagating in the air and the leaked microwave propagating in the substrate material of the relay substrate 1018 can be suppressed by the conductor pin 660 and the substrate removal portion 1062, respectively. Therefore, in the relay substrate 1018, it is possible to further suppress recombination of leaked microwaves can be further suppressed as compared with the relay substrates 618 and 818, and to realize good optical modulation characteristics.

From the viewpoint of effectively suppressing the leaked microwave, it is desirable that at least one conductor pin is provided within a predetermined distance L from the generation point of the leaked microwave in the component mounting portion 350 (for example, the end of the capacitor 354c, which is a single plate capacitor), and/or at least a part of the substrate removal portions 862 and 1062 is provided within the predetermined distance L.

Further, in the present modification example, the conductor pin 660 is used, but the present invention is not limited thereto. Instead of the conductor pin 660, the conductor wire 360 (or a conductor ribbon) as provided on the relay substrate 118 illustrated in FIG. 3 may be used together with the substrate removal portion 1062.

Further, the sequence of arrangement of the conductor pins 660 and the substrate removal portion 1062 on the downstream side of the component mounting portion 350 illustrated in FIG. 10 is an example, and the present invention is not limited thereto. For example, instead of arranging the conductor pin 660 in the immediate vicinity of the component mounting portion 350, the substrate removal portion 862 or 1062 may be arranged in the immediate vicinity of the component mounting portion 350.

Second Embodiment

Next, an optical modulator according to a second embodiment of the present invention will be described. In the optical modulator 100 according to the first embodiment described above, the arrangement pitch of the signal electrodes 112 of the optical modulation element 102 is equal to the arrangement pitch of the signal input terminal 124, but the present invention is not limited thereto. The arrangement pitch of the signal electrodes of the optical modulation element may be larger or smaller than the arrangement pitch of the signal input terminal 124. The present embodiment is a first example in which the arrangement pitch of the signal electrodes of the optical modulation element is smaller than the arrangement pitch of the signal input terminal 124.

Figure 11:
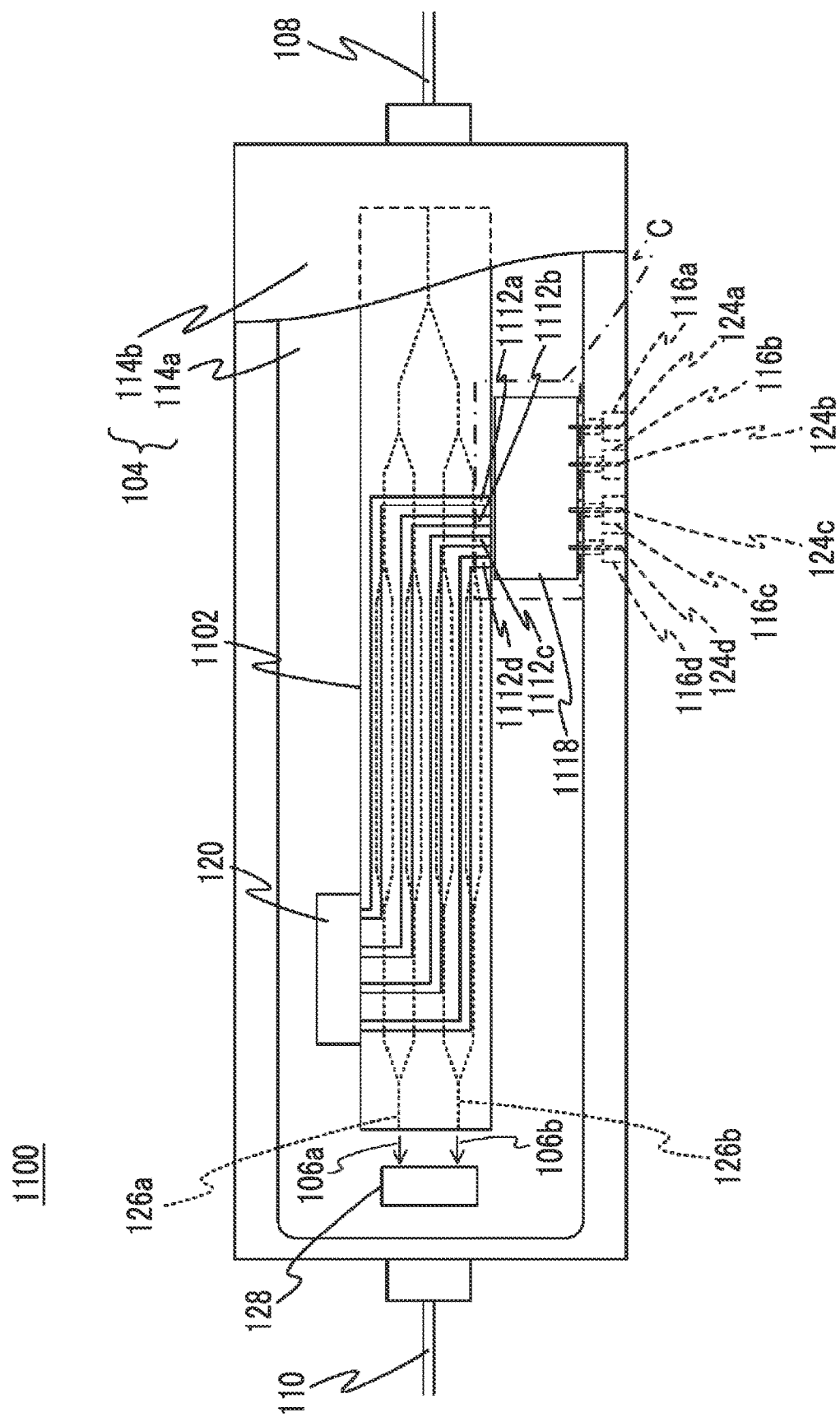
FIG. 11 is a plan view illustrating a configuration of an optical modulator according to a second embodiment.
Figure 12:
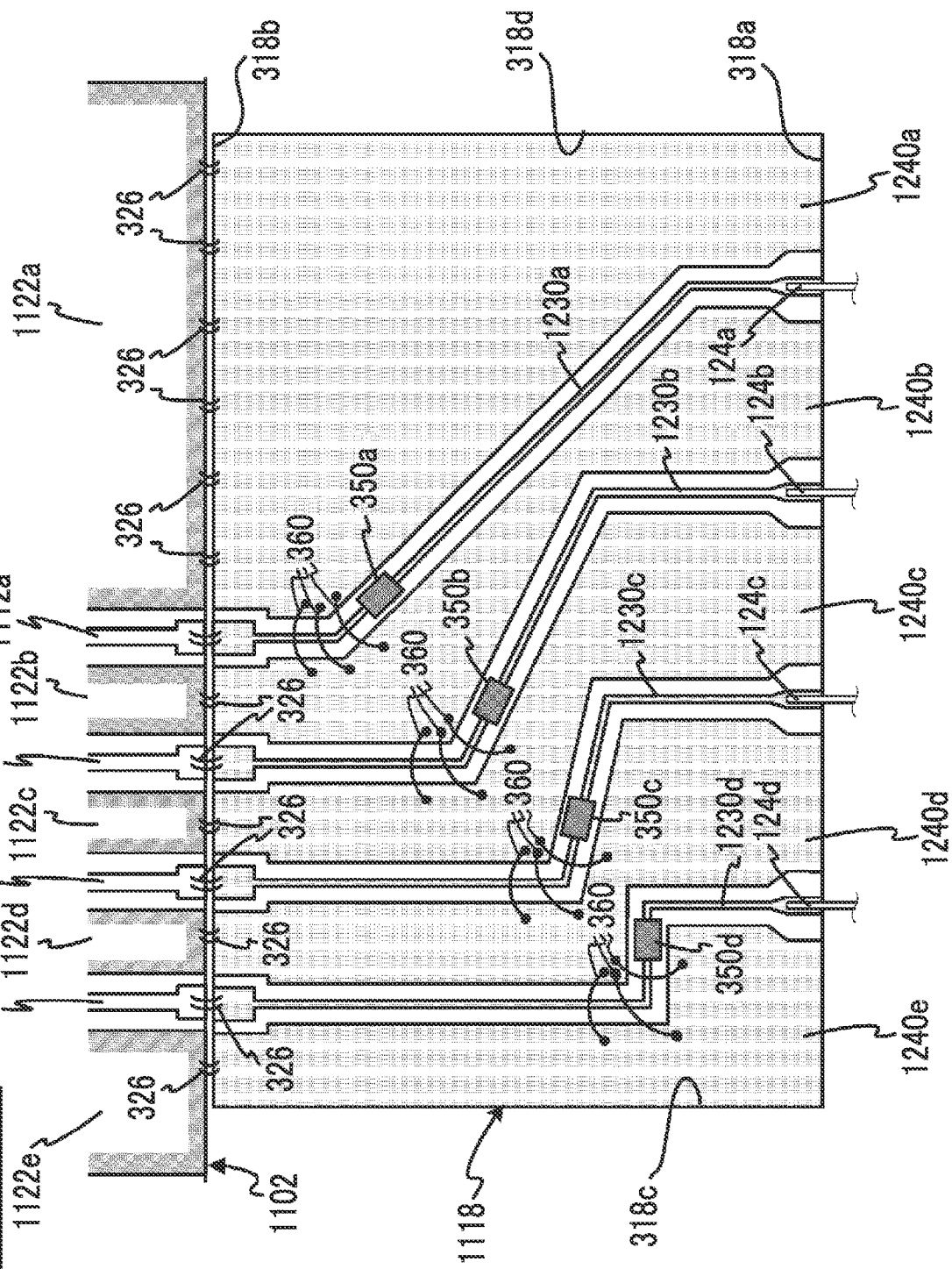
FIG. 12 is a detailed view of a part C of the optical modulator illustrated in FIG. 11.

FIG. 11 is a plan view illustrating a configuration of an optical modulator 1100 according to the second embodiment of the present invention, and FIG. 12 is a partial detailed view of a part C in FIG. 11.

As will be described below, a relay substrate 1118 used in the optical modulator 1100 according to the present embodiment has the same characteristics as the relay substrate 118 illustrated in FIG. 3, but has a signal conductor pattern 1230a or the like formed in a shape different from that of the signal conductor pattern 330a or the like of the relay substrate 118. In particular, in the optical modulator 1100, the arrangement pitch of signal electrodes 1112 of an optical modulation element 1102 is narrower than the arrangement pitch of the signal input terminals 124 included in the housing 104.

In FIG. 11, the same reference numerals as those in FIG. 1 are used for the same components as those of the optical modulator 100 according to the first embodiment illustrated in FIG. 1, and the above description of FIG. 1 will be incorporated herein. The optical modulator 1100 illustrated in FIG. 11 has the same configuration as the optical modulator 100 illustrated in FIG. 1, but is different from the optical modulator 100 in that it includes an optical modulation element 1102 and the relay substrate 1118 instead of the optical modulation element 102 and the relay substrate 118.

The optical modulation element 1102 has the same configuration as the optical modulation element 102, but is different from the optical modulation element 102 in that it includes signal electrodes 1112a, 1112b, 1112c, and 1112d (hereinafter, collectively also referred to as signal electrodes 1112) instead of the signal electrodes 112 and ground electrodes 1122a, 1122b, 1122c, 1122d, and 1122e (hereinafter, collectively also referred to as ground electrodes 1122) instead of the ground electrodes 122 (see FIG. 12).

The signal electrodes 1112 have the same configuration as the signal electrodes 112, but the pitch between the signal electrodes 1112 is different from the pitch between the signal electrodes 112. Further, the ground electrodes 1122 have the same configuration as the ground electrodes 122, but since the ground electrodes 1122 form a coplanar waveguide together with the signal electrodes 1112, shapes thereof are different from the shapes of the ground electrodes 122.

FIG. 12 is a partial detailed view of the part C illustrated in FIG. 11, and illustrates a configuration of the relay substrate 1118 and its surroundings in the optical modulator 1100. In FIG. 12, the same reference numerals as those in FIG. 3 are used for the same components as those of the relay substrate 118 illustrated in FIG. 3, and the above description of FIG. 3 will be incorporated herein.

The relay substrate 1118 has the same configuration as the relay substrate 118 illustrated in FIG. 3, but is different from the relay substrate 118 in that it includes signal conductor patterns 1230a, 1230b, 1230c, and 1230d (collectively also referred to as a signal conductor pattern 1230) instead of the signal conductor patterns 330a, 330b, 330c, and 330d. The relay substrate 1118 is different from the relay substrate 118 illustrated in FIG. 3 in that it includes ground conductor patterns 1240a, 1240b, 1240c, 1240d, and 1240e (hereinafter, collectively also referred to as a ground conductor pattern 1240) instead of the ground conductor patterns 340a, 340b, 340c, 340d, and 340e.

The four signal conductor patterns 1230 have the same configuration as the signal conductor pattern 330 of the relay substrate 118 illustrated in FIG. 3, but are different from the signal conductor pattern 330 in that they each have curved portions downstream of the component mounting portion 350 along the propagation direction of the electrical signal.

Due to the presence of these curved portions, in the signal conductor pattern 1230, the propagation direction of the electrical signal downstream is different from the propagation direction of the electrical signal in the component mounting portion 350 (hence, the propagation direction of the leaked microwave generated from the component mounting portion 350). Therefore, in the signal conductor pattern 1230, it is possible to improve the separability between the propagated microwave and the leaked microwave in the signal conductor pattern 1230.

Then, in the relay substrate 1118, the leaked microwaves are suppressed or absorbed by the conductor wire 360 arranged downstream in the state where the separability between the propagated microwaves and the leaked microwaves is improved as described above. Therefore, as compared with the relay substrate 118, it is possible to further suppress the recombination of leaked microwaves and to realize good optical modulation characteristics.

Next, a modification example of the relay substrate used in the optical modulator 1100 according to the second embodiment will be described.

First Modification Example of Second Embodiment

Figure 13:
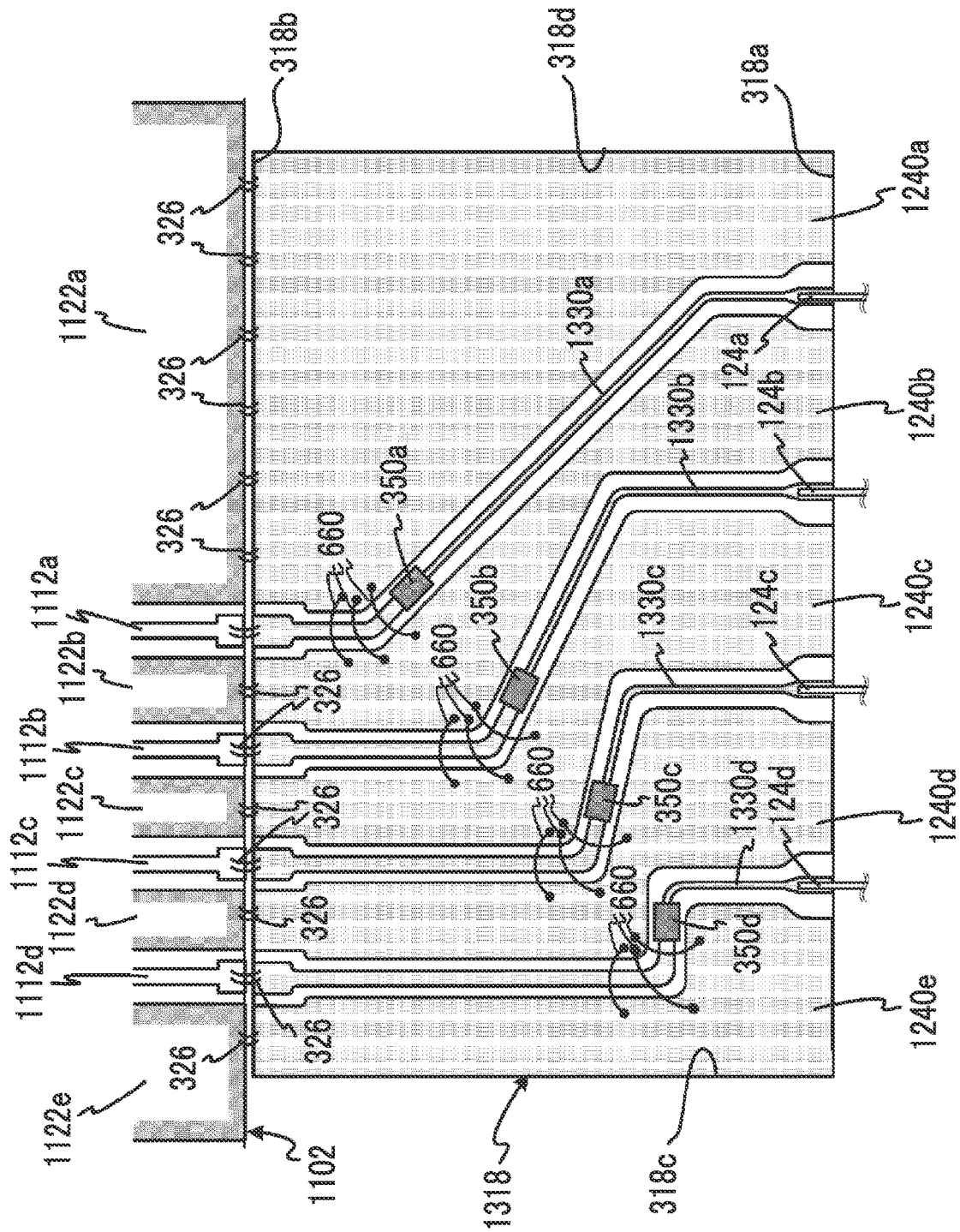
FIG. 13 is a diagram illustrating a configuration of a relay substrate according to a first modification example of the optical modulator according to the second embodiment.

FIG. 13 is a diagram illustrating a configuration of a relay substrate 1318 according to a first modification example of the second embodiment, and is a diagram corresponding to the partial detailed view of the second embodiment illustrated in FIG. 12. The relay substrate 1318 can be used instead of the relay substrate 1118 in the optical modulator 1100 illustrated in FIG. 11. In FIG. 13, the same reference numerals as those in FIG. 12 are used for the same components as those of the relay substrate 1118 illustrated in FIG. 12, and the above description of FIG. 12 will be incorporated herein.

The relay substrate 1318 has the same configuration as the relay substrate 1118 illustrated in FIG. 12, but is different from the relay substrate 1118 in that it includes signal conductor patterns 1330a, 1330b, 1330c, and 1330d (hereinafter, collectively also referred to as a signal conductor pattern 1330) instead of the signal conductor patterns 1230a, 1230b, 1230c, and 1230d. The signal conductor pattern 1330 has the same configuration as the signal conductor pattern 1230, but the curved portion provided in the portion downstream of the component mounting portion 350 is configured by a curved line having no corner portion. In this way, even when the curved portion is configured in a curved line, the separability between the propagated microwave and the leaked microwave can be improved as in the curved portion of the signal conductor pattern 1230 in the relay substrate 1118 illustrated in FIG. 12.

Further, in the signal conductor pattern 1330, similar to the relay substrate 718 illustrated in FIG. 7, the width of the portion downstream of the component mounting portion 350 is formed wider than the width of the portion upstream thereof. Thus, in the signal conductor pattern 1330, the characteristic impedance of the downstream is set lower than the impedance of the upstream, so that the separability between the propagated microwave and the leaked microwave are further improved as compared with the signal conductor pattern 1230 in the relay substrate 1118 illustrated in FIG. 12. As a result, in the relay substrate 1318, it is possible to further suppress the recombination of leaked microwaves and to realize good optical modulation characteristics as compared with the relay substrate 1118.

Second Modification Example of Second Embodiment

Figure 14:
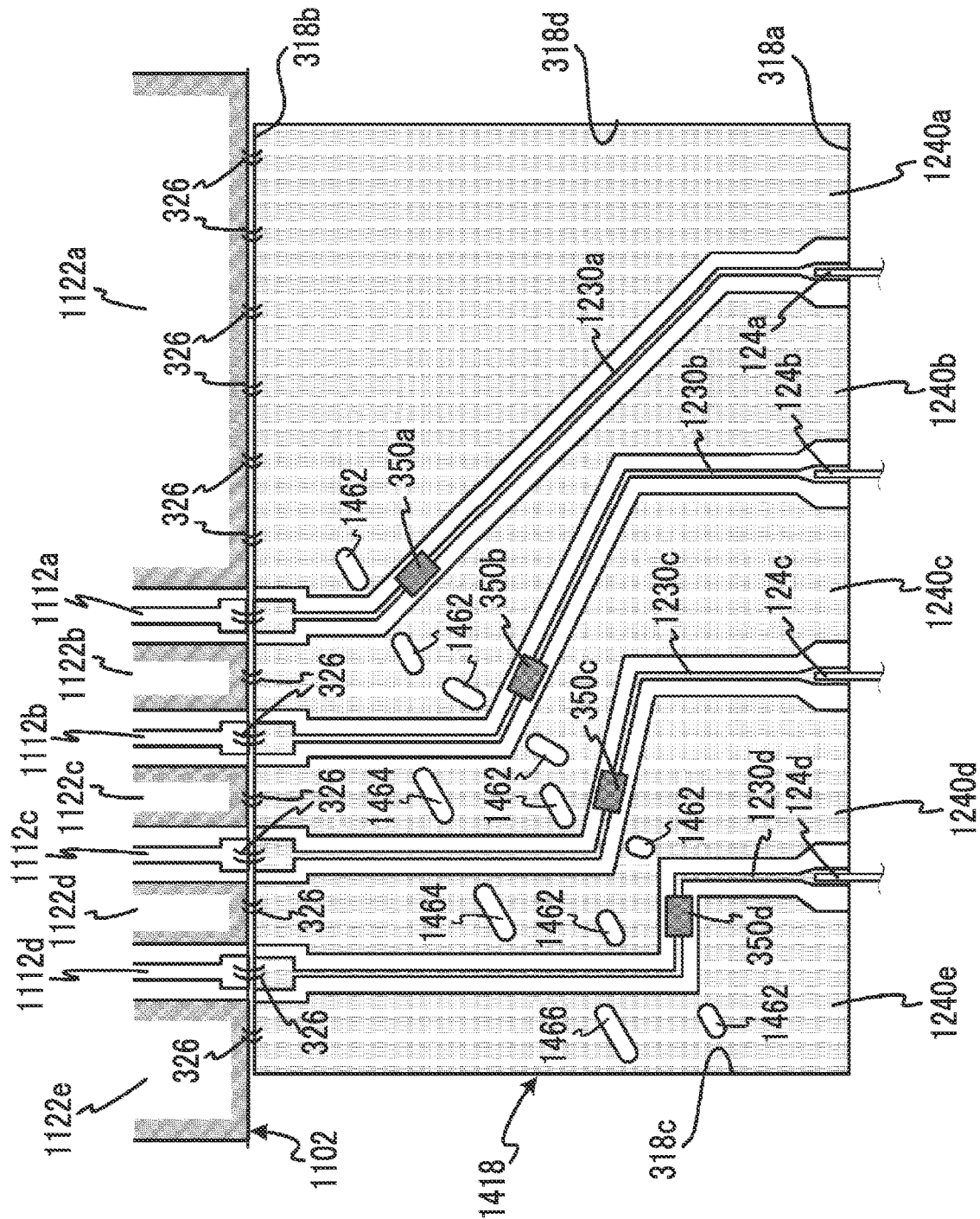
FIG. 14 is a diagram illustrating a configuration of a relay substrate according to a second modification example of the optical modulator according to the second embodiment.

FIG. 14 is a diagram illustrating a configuration of a relay substrate 1418 according to a second modification example of the second embodiment, and is a diagram corresponding to the partial detailed view of the second embodiment illustrated in FIG. 12. The relay substrate 1418 can be used instead of the relay substrate 1118 in the optical modulator 1100 illustrated in FIG. 11. In FIG. 14, the same reference numerals as those in FIG. 12 are used for the same components as those of the relay substrate 1118 illustrated in FIG. 12, and the above description of FIG. 12 will be incorporated herein.

The relay substrate 1418 has the same configuration as the relay substrate 1118 illustrated in FIG. 12, but is different from the relay substrate 1118 in that it does not have the conductor wire 360, and substrate removal portions 1462, 1464, and 1466 are provided in the ground conductor pattern 1240.

The substrate removal portions 1462, 1464, and 1466 have the same configuration as the substrate removal portion 862 of the relay substrate 818 illustrated in FIG. 8. The substrate removal portion 1462 is provided at a position sandwiching a portion downstream of the component mounting portion 350 of each of the signal conductor patterns 1230, as in the case of the relay substrate 818. Thus, the leaked microwave generated from the component mounting portion 350 and propagating in the substrate material of the relay substrate 1418 is suppressed.

In a configuration such as the relay substrate 1418 in which the extending directions of the signal conductor patterns 1330 in the component mounting portion 350 are different in various ways, the leaked microwave generated from the component mounting portion 350 can propagate in various different directions, and can be reflected by the edge of the relay substrate 1418 or the like and propagate in a complicated manner. Therefore, the relay substrate 1418 is further provided with substrate removal portions 1464 and 1466 in order to further suppress the propagation of leaked microwaves in the substrate material. Thus, in the relay substrate 1418, it is possible to further suppress the recombination of leaked microwaves and to realize good optical modulation characteristics as compared with the relay substrate 1118 illustrated in FIG. 12.

Also in the relay substrate 1418, for example, similar to the relay substrate 1018 illustrated in FIG. 10, leaked microwaves propagating in space can also be suppressed in combination with the conductor pins 660 and/or with the conductor wires 360 of the relay substrate 118 illustrated in FIG. 3.

Third Embodiment

Next, an optical modulator according to a third embodiment of the present invention will be described. In the relay substrates 1118, 1318, and 1418 according to the second embodiment and modification examples thereof described above, the signal conductor patterns 1230 and 1330 are configured as shapes including bending, but of course, the present invention is not limited to such bending shapes. The signal conductor pattern is not limited to bending, and may be configured by using a gentle curve having a relatively small curvature.

The present embodiment is a second example in which the arrangement pitch of the signal electrodes of the optical modulation element is smaller than the arrangement pitch of the signal input terminals 124, and in particular, as will be described later, the curved portions of signal conductor patterns 1630a, 1630b, 1630c, and 1630d of a relay substrate 1518 are configured by curves instead of bending.

Figure 15:
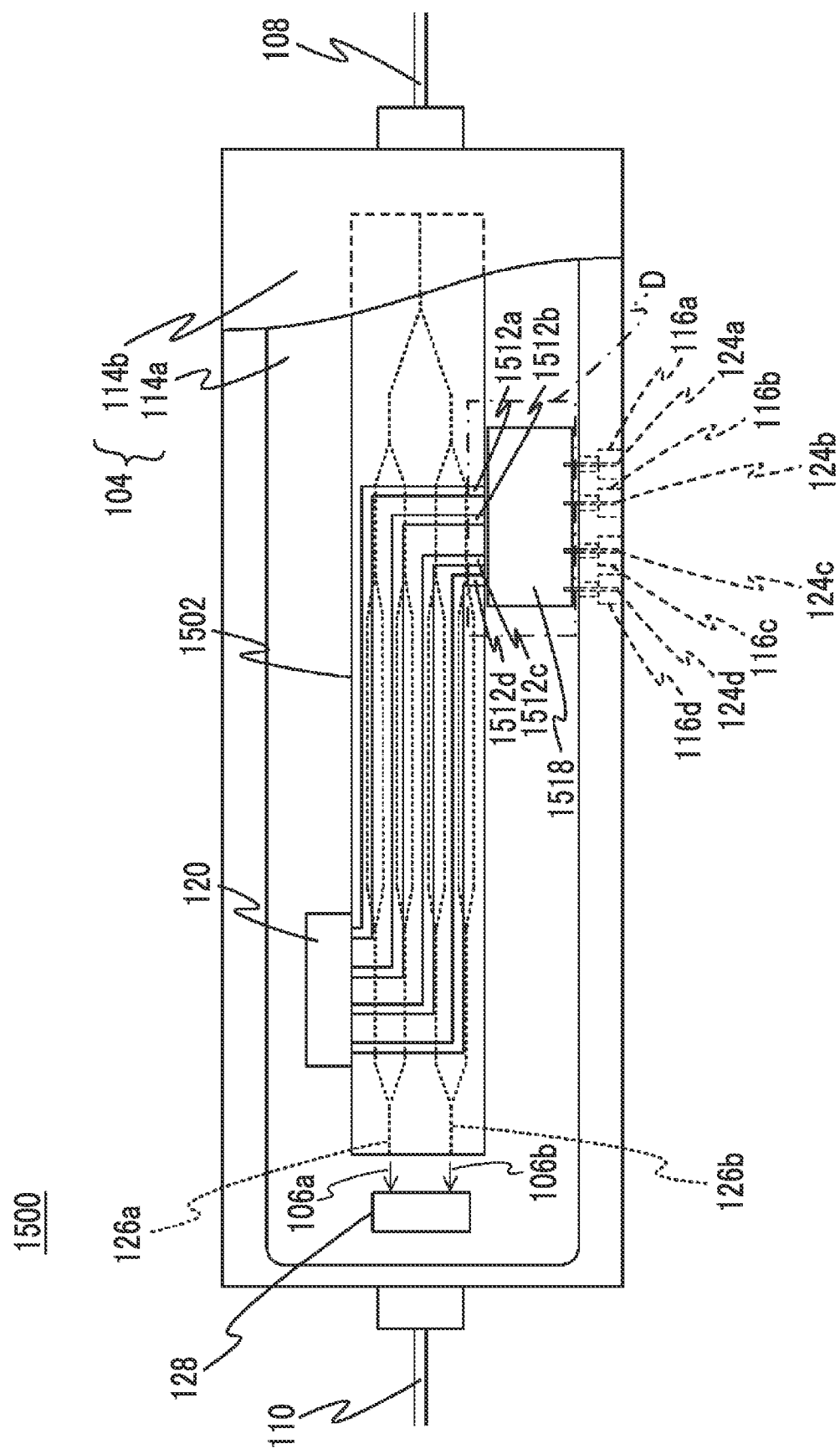
FIG. 15 is a plan view illustrating a configuration of an optical modulator according to a third embodiment.
Figure 16:
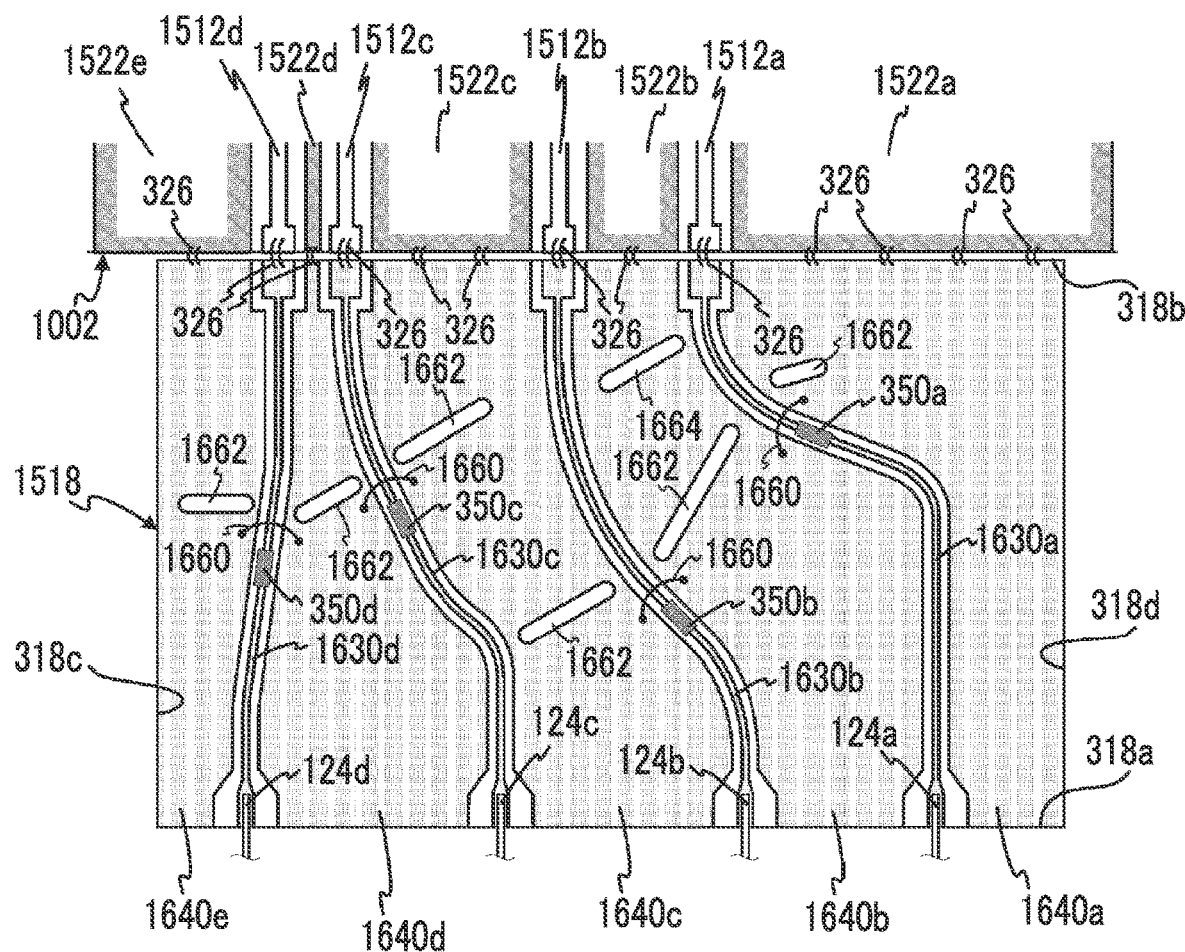
FIG. 16 is a detailed view of a part D of the optical modulator illustrated in FIG. 15.

FIG. 15 is a plan view illustrating a configuration of an optical modulator 1500 according to the third embodiment of the present invention, and FIG. 16 is a partial detailed view of a part D in FIG. 15. In FIG. 15, the same reference numerals as those in FIG. 1 are used for the same components as those of the optical modulator 100 according to the first embodiment illustrated in FIG. 1, and the above description of FIG. 1 will be incorporated herein. The optical modulator 1500 illustrated in FIG. 15 has the same configuration as the optical modulator 100 illustrated in FIG. 1, but is different from the optical modulator 100 in that it includes an optical modulation element 1502 and the relay substrate 1518 instead of the optical modulation element 102 and the relay substrate 118.

The optical modulation element 1502 has the same configuration as the optical modulation element 102, but is different from the optical modulation element 102 in that it includes signal electrodes 1512a, 1512b, 1512c, and 1512d (hereinafter, collectively also referred to as signal electrodes 1512) instead of the signal electrodes 112 and ground electrodes 1522a, 1522b, 1522c, 1522d, and 1522e (hereinafter, collectively also referred to as ground electrodes 1522) instead of the ground electrodes 122.

The signal electrodes 1512 have the same configuration as the signal electrodes 112, but the pitch between the signal electrodes 1512 is different from the pitch between the signal electrodes 112. Further, the ground electrodes 1522 have the same configuration as the ground electrodes 122, but since the ground electrodes 1522 form a coplanar waveguide together with the signal electrodes 1512, shapes thereof are different from the shapes of the ground electrodes 122.

FIG. 16 is a partial detailed view of the part D illustrated in FIG. 15, and illustrates a configuration of the relay substrate 1518 and its surroundings in the optical modulator 1500. In FIG. 16, the same reference numerals as those in FIGS. 3 and 12 are used for the same components as those of the relay substrates 118 and 1118 illustrated in FIGS. 3 and 12, and the above description of FIGS. 3 and 12 will be incorporated herein.

The relay substrate 1518 has the same configuration as the relay substrate 1118 illustrated in FIG. 12, but is different from the relay substrate 1118 in that it includes signal conductor patterns 1630a, 1630b, 1630c, and 1630d (hereinafter, collectively also referred to as a signal conductor pattern 1630) instead of the signal conductor patterns 1230a, 1230b, 1230c, and 1230d. The relay substrate 1518 is different from the relay substrate 1118 illustrated in FIG. 12 in that it includes ground conductor patterns 1640a, 1640b, 1640c, 1640d, and 1640e (hereinafter, collectively also referred to as a ground conductor pattern 1640) instead of the ground conductor patterns 1240a, 1240b, 1240c, 1240d, and 1240e.

The four signal conductor patterns 1630 have the same configuration as the signal conductor patterns 1230 of the relay substrate 1118 illustrated in FIG. 12, but are different from the signal conductor patterns 1230 in that they do not have a curved portion and are configured in a curved shape. The signal conductor pattern 1630 does not have a curved portion in this way, but due to its curved shape, it has a portion in which the propagated microwave propagates in a direction different from the propagation direction of the leaked microwave in the downstream of the component mounting portion 350. Therefore, the separability between the leaked microwave and the propagated microwave can be improved to some extent in those portions.

Further, on two adjacent ground conductor patterns 1640 that sandwich a portion downstream of the component mounting portion 350 along the propagation direction of each electrical signal for each of the signal conductor patterns 1630, conductor wires 1660 connected to these ground conductor patterns 1640 are arranged. Thus, the leaked microwave generated from the component mounting portion 350 and propagating in the air is suppressed.

The ground conductor patterns 1640 have the same configuration as the ground conductor patterns 1240, but since the ground conductor patterns 1640 form a coplanar waveguide together with the signal conductor patterns 1630, shapes thereof are different from those of the ground conductor patterns 1240.

The ground conductor pattern 1640 is provided with a substrate removal portion 1662 at a position sandwiching a portion of the signal conductor pattern 1630 located downstream of the component mounting portion 350 along the propagation direction of the electrical signal. The substrate removal portion 1662 suppresses leaked microwaves generated from the component mounting portion 350 and propagating in the substrate material of the relay substrate 1518, similar to the substrate removal portion 862 and the like described above.

From the above configuration, in the relay substrate 1518, good optical modulation characteristics can be realized by suppressing the recombination of the leaked microwave propagating in the air and inside the substrate material while improving the separability between the propagated microwave and the leaked microwave in the signal conductor pattern 1630.

Fourth Embodiment

Next, a fourth embodiment of the present invention will be described. The present embodiment is an optical transmission apparatus 2100 on which the optical modulator 100 including the relay substrate 118 according to the first embodiment is mounted. This configuration is an example, and instead of the optical modulator 100 including the relay substrate 118, any of the optical modulator 100 using the relay substrates 418, 718, 818, 918, and 1018 according to the first to fifth modification examples of the first embodiment, the optical modulators 1100 according to the second embodiment, the optical modulator 1100, the optical modulator 1100 using the relay substrates 1318 and 1418 according to the modification examples of the second embodiment, and the optical modulator 1500 according to the third embodiment may be mounted on the optical transmission apparatus 2100.

Figure 17:
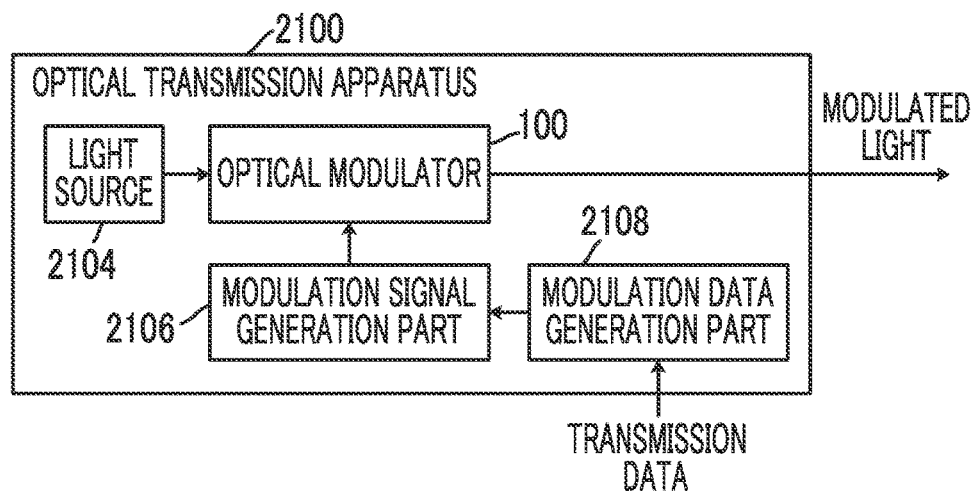
FIG. 17 is a diagram illustrating a configuration of an optical transmission apparatus according to a fourth embodiment of the present invention.
Figure 18:
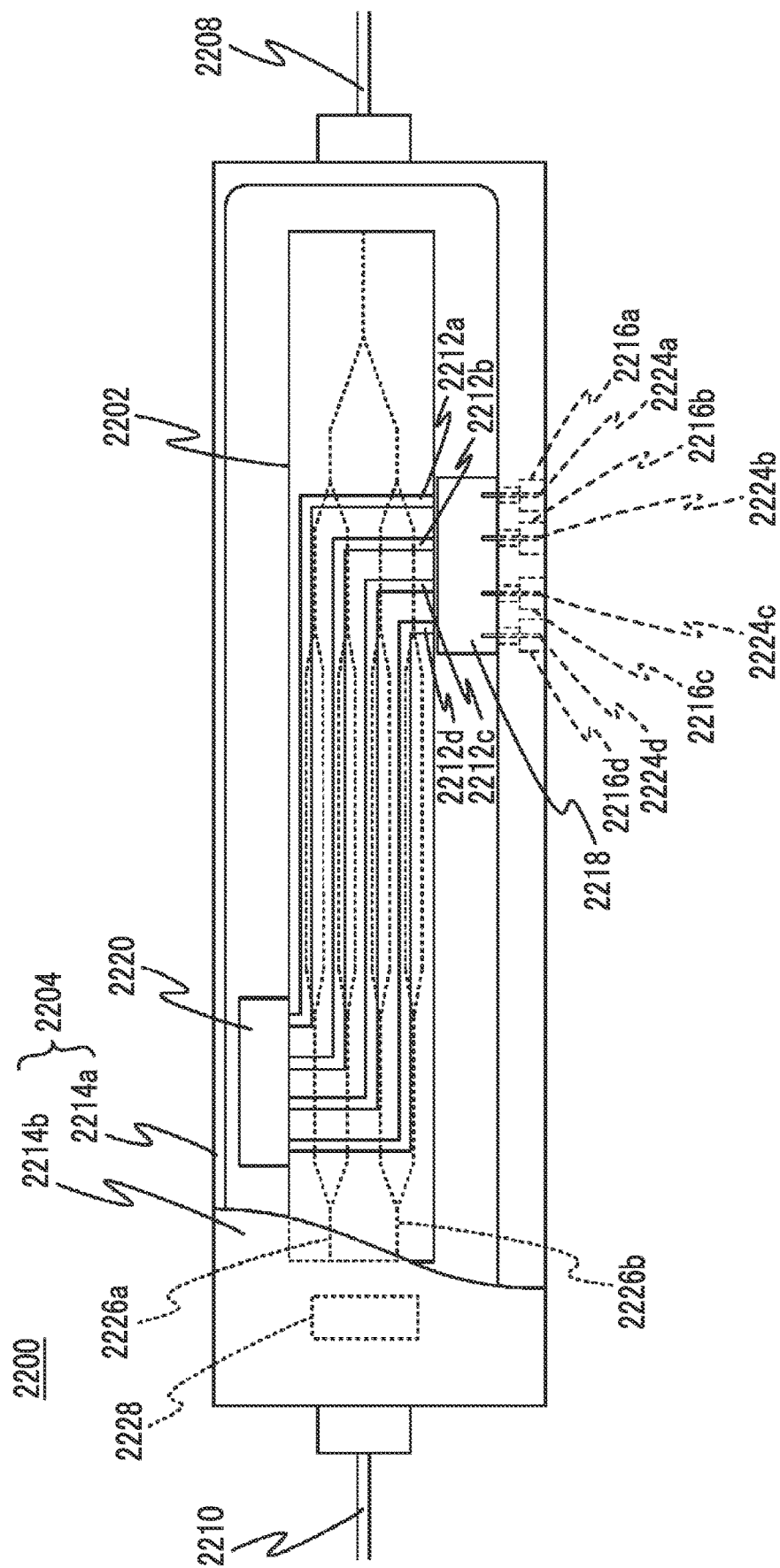
FIG. 18 illustrates an example of a configuration of an optical modulator in the related art.
Figure 19:
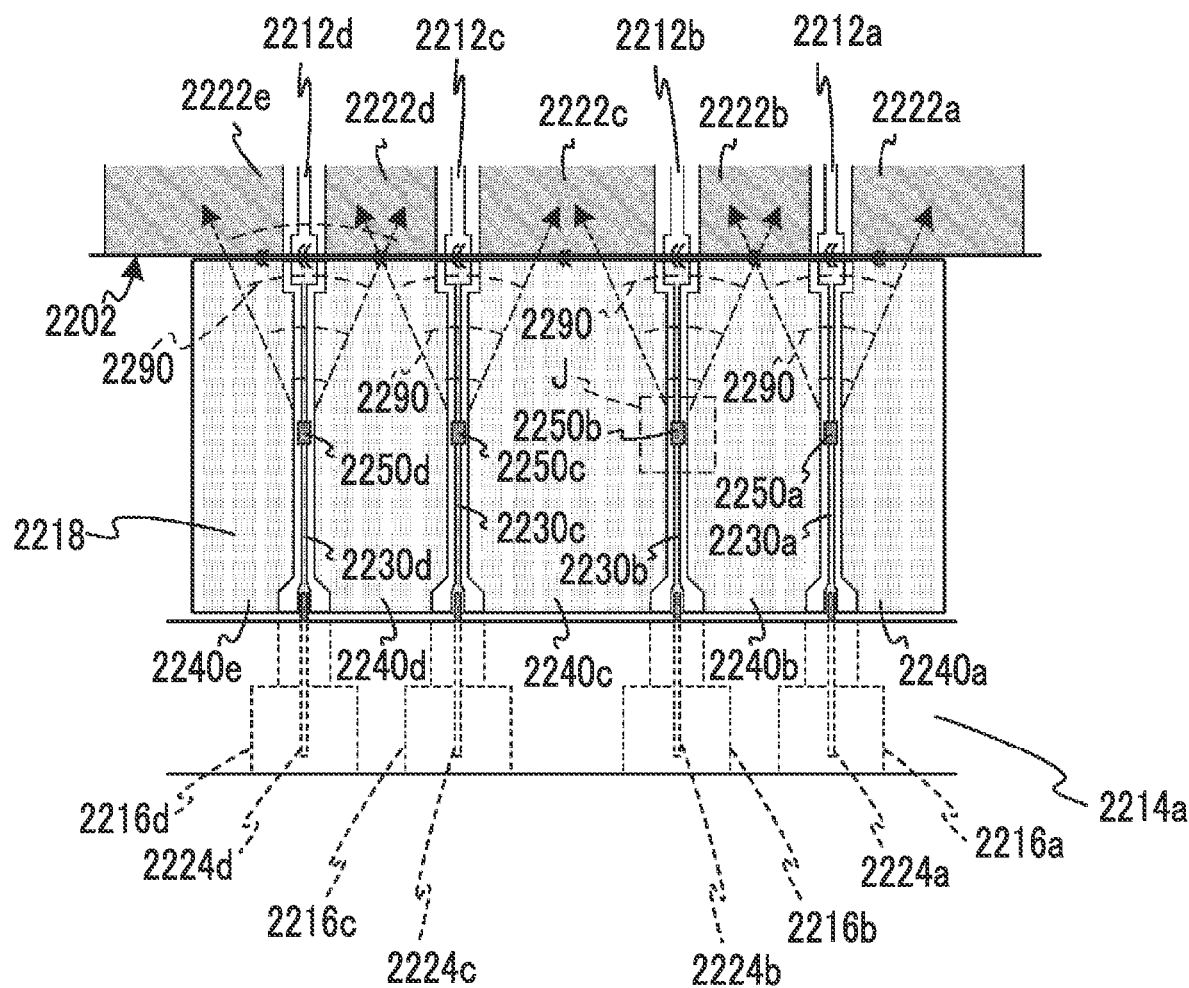
FIG. 19 is a partial detailed view illustrating the periphery of a relay substrate in the optical modulator in the related art.
Figure 20:
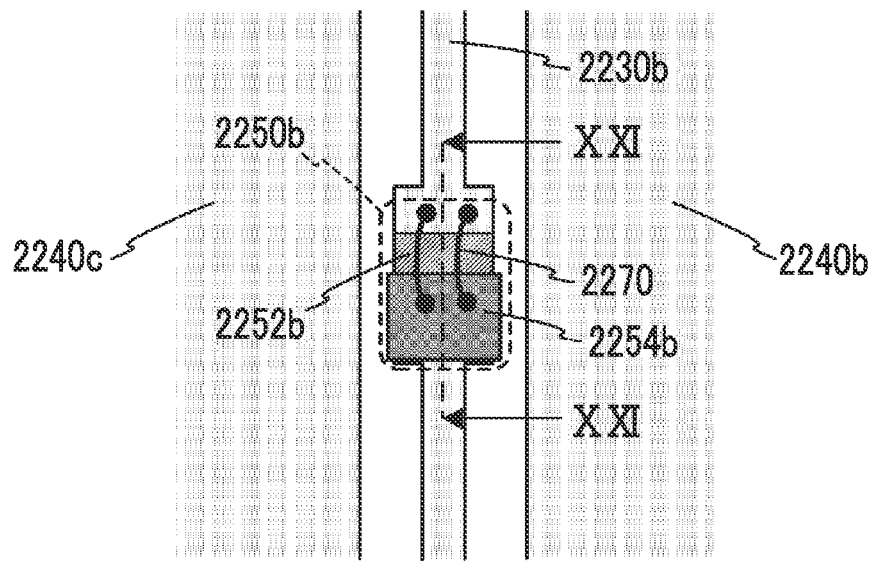
FIG. 20 is a partial detailed view illustrating the details of a part J illustrated in FIG. 19.
Figure 21:
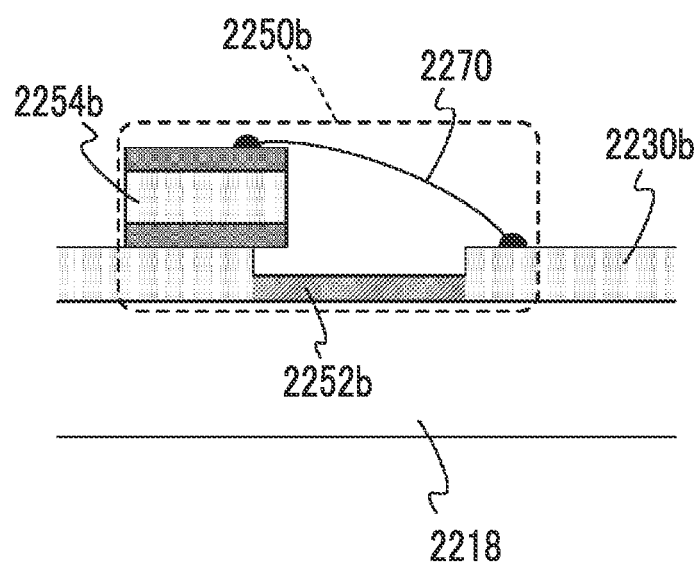
FIG. 21 is a cross-sectional view taken along arrow line XXI-XXI of the partial detailed view illustrated in FIG. 20.

FIG. 17 is a diagram illustrating a configuration of the optical transmission apparatus 2100 according to the present embodiment. An optical transmission apparatus 2100 includes an optical modulator 100, a light source 2104 that inputs light to the optical modulator 100, a modulation signal generation part 2106, and a modulation data generation part 2108.

The modulation data generation part 2108 receives transmission data given from the outside, generates modulation data for transmitting the transmission data (for example, data obtained by converting or processing transmission data into a predetermined data format), and outputs the generated modulation data to the modulation signal generation part 2106.

The modulation signal generation part 2106 is an electronic circuit (drive circuit) that outputs an electrical signal for causing the optical modulator 100 to perform a modulation operation, generates a modulation signal which is a high-frequency signal for making the optical modulator 100 perform an optical modulation operation according to the modulation data, based on the modulation data which is output by the modulation data generation part 2108, and inputs the generated modulation signal to the optical modulator 100. The modulation signal includes four high-frequency electrical signals corresponding to the four signal electrodes 112a, 112b, 112c, and 112d of the optical modulation element 102 provided in the optical modulator 100.

The four high-frequency electrical signals are input from the signal input terminals 124a, 124b, 124c, and 124d of the respective electrical connectors 116a, 116b, 116c, and 116d of the optical modulator 100 to the signal conductor patterns 330a, 330b, 330c, and 330d on the relay substrate 118, and are input to the signal electrodes 112a, 112b, 112c, and 112d of the optical modulation element 102 via the signal conductor pattern 330a or the like.

Thus, the light output from the light source 2104 is, for example, DP-QPSK modulated by the optical modulator 100 and output as modulated light from the optical transmission apparatus 2100.

In particular, since the optical modulator 100 is used in the optical transmission apparatus 2100, it is possible to suppress fluctuations in the frequency characteristics of the signal conductor pattern 330 caused by leaked microwaves that may be generated from the component mounting portion 350 in the relay substrate 118, to ensure good modulation characteristics, and to realize good transmission characteristics.

The present invention is not limited to the configurations of the embodiments and the modification examples described above, and can be realized in various aspects without departing from the gist thereof.

For example, in the first and second embodiments and the modification examples thereof and the third embodiment described above, it is assumed that all of the signal conductor patterns 330, 1230, 1330, and 1630 are provided with one component mounting portion 350, but the present invention is not limited thereto. At least one component mounting portion 350 may be provided on one relay substrate depending on the degree of stability of frequency characteristics in the signal conductor pattern required for the optical modulator, or a plurality of component mounting portions 350 may be provided for the same signal conductor pattern. That is, at least one signal conductor pattern may be provided with at least one component mounting portion 350. When a plurality of component mounting portions are provided in the same signal conductor pattern, a recombination suppression structure composed of the above-mentioned metal body (such as conductor wire, conductor ribbon, conductor pin, and the like) or the substrate removal portion may be provided downstream of each component mounting portion.

Further, in the first and second embodiments and modification examples thereof, and the third embodiment described above, the conductor wire 360 and the conductor pin 660, which are metal bodies, the substrate removal portion 862, and the like are provided on the two ground conductor patterns 340 sandwiching the signal conductor pattern 330, respectively, but the present invention is not limited thereto. The conductor wire 360, the conductor pin 660, the substrate removal portion 862, and the like may be provided only on one of the two ground conductor patterns 340 sandwiching the signal conductor pattern 330. Even in this configuration, it is possible to suppress the propagation of leaked microwaves to some extent, to suppress fluctuations in the frequency characteristics of the signal conductor pattern 330 as a whole including the component mounting portion 350, and to realize good optical modulation characteristics.

Further, the directions of the major axis of the substrate removal portion 862 and the like described as the oval shape in the first and second embodiments and the modification examples thereof and the third embodiment described above, on the relay substrate 118 and the like, are not limited to the directions illustrated in FIGS. 8, 9, 10, 14, and 16. The extending direction of the major axis of the substrate removal portion configured as an oval shape on the relay substrate may be any direction as long as the propagation can be inhibited, for example, depending on the propagation direction of the leaked microwave in the relay substrate.

Further, in the above-described embodiment, the optical modulation element 102 and the like and the relay substrate 118 and the like are accommodated in the housing 104, but in addition to these, an electronic circuit element (driver element) for operating the optical modulation element 102 and the like may also be accommodated in the housing 104.

As described above, the optical modulator 100 according to the above-described first embodiment includes the optical modulation element 102 including a plurality of signal electrodes 112, the relay substrate 118, and the housing 104 in which the optical modulation element 102 and the relay substrate 118 are accommodated. The optical modulation element 102 is configured to generate two modulated light beams 106a and 106b, each of which is modulated by two sets of electrical signals, each including two electrical signals. The relay substrate 118 is formed with a plurality of signal input terminals 124 that input an electrical signal applied to each of the signal electrodes 112, a plurality of signal conductor patterns 330 that electrically connect the signal input terminals 124 to the signal electrodes 112, and a plurality of ground conductor patterns 340. Further, the relay substrate 118 is configured to propagate the above two sets of electrical signals by two pairs of signal conductor patterns 330, each pair being composed of two adjacent signal conductor patterns 330. At least one signal conductor pattern 330 includes at least one component mounting portion 350 including at least a parallel circuit of the thin film resistor 352c and the capacitor 354c, for example. The relay substrate 118 includes the conductor wire 360 as a metal body connected on the ground conductor pattern 340, which is provided at a position sandwiching a portion of the at least one signal conductor pattern 330 downstream of the component mounting portion 350 along a propagation direction of the electrical signal, which is provided at a position sandwiching a portion downstream of the component mounting portion along a propagation direction of the electrical signal. In this case, the optical modulator 100 can include the relay substrate 618 including the conductor pin 660 as a metal body, and the relay substrate 818 including the substrate removal portion 862 which is provided instead of or in addition to the metal body and from which the substrate material is removed.

According to this configuration, in the optical modulator 100 in which the signal conductor pattern 330 is provided with the component mounting portion 350 composed of an electrical circuit element such as an electric filter, it is possible to suppress the leaked microwaves that may be generated from the component mounting portion 350 from recombination to the signal conductor pattern 330 (or the propagated microwave inside the signal conductor pattern 330). As a result, it is possible to suppress fluctuations in the frequency characteristics of the signal conductor patterns 330 as a whole including the component mounting portion 350 which is an electric filter, for example, and to realize good optical modulation characteristics.

Further, in the optical modulator 100, the metal body (the conductor wire 360 or the conductor pin 660) or the substrate removal portion 862 is arranged at a distance shorter than a wavelength of a high-frequency signal which is the electrical signal, from an end of the electrical circuit element (for example, the capacitor 354c) constituting the component mounting portion 350, along the propagation direction of the electrical signal. According to this configuration, it is possible to effectively inhibit the leaked microwaves from propagating in the air and/or inside the substrate material, and to realize good modulation characteristics.

Further, in the optical modulator 100, the metal body (the conductor wire 360 or the conductor pin 660) is formed higher than the height of the electrical circuit element (for example, the capacitor 354c) constituting the component mounting portion 350. According to this configuration, it is possible to effectively inhibit the leaked microwaves from propagating in the air and/or inside the substrate material, and to realize good modulation characteristics.

Further, the optical modulator 100 can include the relay substrate 718. In the at least one signal conductor pattern 730 of the relay substrate 718, a characteristic impedance downstream of the component mounting portion 350 along the propagation direction of the electrical signal is set lower than a characteristic impedance upstream of the component mounting portion 350.

According to this configuration, the separability between the propagated microwave and the leaked microwave in the downstream of the signal conductor pattern 730 can be improved, and the recombination of the leaked microwave can be further suppressed. As a result, it is possible to suppress fluctuations in the frequency characteristics of the signal conductor pattern 730 as a whole including the component mounting portion 350, and to realize good optical modulation characteristics.

In the relay substrate 718 that the optical modulator 100 may include, the portion where the characteristic impedance is set low is provided by forming a width of the signal conductor pattern 730 wider than a width of the signal conductor pattern 730 in the upstream. According to this configuration, a portion having a low characteristic impedance can be easily formed without complicated design, and good optical modulation characteristics can be realized.

Further, the optical modulator can be the optical modulator 1100 including the relay substrate 1118 according to the second embodiment. In the relay substrate 1118, the signal conductor pattern 1230 has a curved portion downstream of the component mounting portion 350 along the propagation direction of the electrical signal. According to this configuration, the propagation direction of the propagated microwave in the downstream portion can be made different from the propagation direction of the leaked microwave, the separability between the two can be improved, and the recombination of the leaked microwave can be further suppressed. As a result, it is possible to suppress fluctuations in the frequency characteristics of the signal conductor pattern 1230 as a whole including the component mounting portion 350, and to realize good optical modulation characteristics.

Further, the metal body provided on the relay substrate of the optical modulator 100 may be composed of the conductor wire 360 as provided by the relay substrate 118 or a conductor ribbon as an alternative thereof, or the conductor pin 660 as provided by the relay substrate 618, which has at least one end connected to the ground conductor pattern 340 or the like. According to this configuration, it is possible to suppress recombination of leaked microwaves with a simple configuration without using special parts, and to realize good optical modulation characteristics.

Further, the substrate removal portion 862 of the relay substrate 818 that the optical modulator 100 may include may be a via or a through hole. According to this configuration, it is possible to suppress recombination of leaked microwaves with a simple configuration by using a structure generally used for a relay substrate, and to realize good optical modulation characteristics.

Further, the optical transmission apparatus 2100 according to the fourth embodiment described above includes any of the optical modulators 100 and 1100 according to the first and second embodiments or the optical modulators 100 and 1100 using the relay substrates according to the modification examples thereof or the optical modulator 1500 according to the third embodiment, and includes the modulation signal generation part 2106 which is an electronic circuit that outputs an electrical signal for causing the corresponding optical modulator to perform a modulation operation, and the like. According to this configuration, it is possible to suppress fluctuations in the frequency characteristics of the signal conductor pattern caused by recombination of leaked microwaves, which becomes remarkable as the transmission rate is increased, for example, and to realize stable and good transmission characteristics.

REFERENCE SIGNS LIST

100, 1100, 1500, 2200 . . . optical modulator
102, 1102, 1502, 2202 . . . optical modulation element
104, 2204 . . . housing
106a, 106b . . . modulated light
108, 2208 . . . input optical fiber
110, 2210 . . . output optical fiber
112, 112a, 112b, 112c, 112d, 1112, 1112a, 1112b, 1112c, 1112d, 1512, 1512a, 1512b, 1512c, 1512d, 2212, 2212a, 2212b, 2212c, 2212d . . . signal electrode
114a, 2214a . . . case
114b, 2214b . . . cover
116, 116a, 116b, 116c, 116d, 2216, 2216a, 2216b, 2216c, 2216d . . . electrical connector
118, 618, 718, 818, 918, 1018, 1118, 1318, 1418, 1518, 2218 . . . relay substrate
120, 2220 . . . terminator
122, 122a, 122b, 122c, 122d, 122e, 1122, 1122a, 1122b, 1122c, 1122d, 1122e, 1522, 1522a, 1522b, 1522c, 1522d, 1522e, 2222a, 2222b, 2222c, 2222d, 2222e . . . ground electrode
124, 124a, 124b, 124c, 124d, 2224, 2224a, 2224b, 2224c, 2224d . . . signal input terminal
126a, 126b . . . output optical waveguide
318a . . . signal input side
318b . . . signal output side
318c, 318d . . . side edge
326, 328, 360, 2270 . . . conductor wire
330, 330a, 330b, 330c, 330d, 730, 730a, 730b, 730c, 730d, 1230, 1230a, 1230b, 1230c, 1230d, 1330, 1330a, 1330b, 1330c, 1330d, 1630, 1630a, 1630b, 1630c, 1630d, 2230, 2230a, 2230b, 2230c, 2230d . . . signal conductor pattern
340, 340a, 340b, 340c, 340d, 340e, 1240, 1240a, 1240b, 1240c, 1240d, 1640, 1640a, 1640b, 1640c, 1640d, 2240, 2240a, 2240b, 2240c, 2240d, 2240e . . . ground conductor pattern
350, 350a, 350b, 350c, 350d . . . component mounting portion
660 . . . conductor pin
862, 962, 1062, 1462, 1464, 1466, 1662, 1664 . . . substrate removal portion
2100 . . . optical transmission apparatus
2104 . . . light source
2106 . . . modulation signal generation part
2108 . . . modulation data generation part 352c, 2252b . . . thin film resistor
354c, 2254b . . . capacitor
2290 . . . leaked microwave The invention clamied is:

1. An optical modulator comprising:
an optical modulation element that is configured to generate two modulated light beams, each of which is modulated by two sets of electrical signals, each set including two electrical signals, and that includes a plurality of signal electrodes;
a plurality of signal input terminals, each of which inputs an electrical signal to be applied to each of the signal electrodes;
a relay substrate on which a plurality of signal conductor patterns that electrically connect the signal input terminals to the signal electrodes and a plurality of ground conductor patterns are formed, the relay substrate being configured to propagate the two sets of electrical signals by two pairs of the signal conductor patterns, each pair being composed of two adjacent signal conductor patterns; and
a housing in which the optical modulation element and the relay substrate are accommodated,
wherein each of at least one pair of two adjacent signal conductor patterns includes a component mounting portion including at least a parallel circuit of a resistor and a capacitor, each of the component mounting portions is mounted on portions of the two adjacent signal conductor patterns having different signal propagation directions to each other, and
the relay substrate includes a metal body connected on the ground conductor pattern or a substrate removal portion from which a substrate material of the relay substrate is removed, the metal body or the substrate removal portion being provided at a position sandwiching a portion of each of the at least one pair of two signal conductor patterns downstream of the component mounting portion along a propagation direction of the electrical signal.

2. The optical modulator according to claim 1,
wherein the metal body or the substrate removal portion is arranged at a distance shorter than a wavelength of a high-frequency signal which is the electrical signal, from an end of an electrical circuit element constituting the component mounting portion, along the propagation direction of the electrical signal.

3. The optical modulator according to claim 1,
wherein each of the component mounting portions is an electrical circuit element, and the metal body is formed higher than a height of the electrical circuit element constituting the component mounting portion.

4. The optical modulator according to claim 1,
wherein in each of the at least one pair of the two signal conductor patterns, a characteristic impedance downstream of the component mounting portion along the propagation direction of the electrical signal is set lower than a characteristic impedance upstream of the component mounting portion.

5. The optical modulator according to claim 4,
wherein a portion where the characteristic impedance is set low is provided by forming a width of each of the at least one pair of the two signal conductor patterns wider than a width thereof in the upstream.

6. The optical modulator according to claim 1,
wherein each of the at least one pair of the two signal conductor patterns has a curved portion downstream of the component mounting portion along the propagation direction of the electrical signal.

7. The optical modulator according to claim 1,
wherein the metal body is composed of a conductor wire, a conductor ribbon, or a conductor pin whose at least one end is connected to the ground conductor pattern.

8. The optical modulator according to claim 1,
wherein the substrate removal portion is a via or a through hole.

9. An optical transmission apparatus comprising:
the optical modulator according to claim 1; and
an electronic circuit that outputs an electrical signal for causing the optical modulator to perform a modulation operation.

* * * * *